United States Patent
Seo et al.

(10) Patent No.: US 10,652,876 B2
(45) Date of Patent: May 12, 2020

(54) METHOD FOR TRANSMITTING AND RECEIVING CONTROL INFORMATION IN WIRELESS COMMUNICATION SYSTEM, AND APPARATUS THEREFOR

(71) Applicant: LG ELECTRONICS INC., Seoul (KR)

(72) Inventors: Inkwon Seo, Seoul (KR); Kijun Kim, Seoul (KR); Joonkui Ahn, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 16/085,522

(22) PCT Filed: Mar. 16, 2017

(86) PCT No.: PCT/KR2017/002845
§ 371 (c)(1),
(2) Date: Sep. 14, 2018

(87) PCT Pub. No.: WO2017/160100
PCT Pub. Date: Sep. 21, 2017

(65) Prior Publication Data
US 2019/0037540 A1 Jan. 31, 2019

Related U.S. Application Data

(60) Provisional application No. 62/309,435, filed on Mar. 16, 2016, provisional application No. 62/455,553, filed on Feb. 6, 2017.

(51) Int. Cl.
*H04W 72/04* (2009.01)
*H04B 7/06* (2006.01)
*H04L 5/00* (2006.01)
*H04W 72/12* (2009.01)

(52) U.S. Cl.
CPC ........ *H04W 72/042* (2013.01); *H04B 7/0617* (2013.01); *H04L 5/0053* (2013.01); *H04W 72/1273* (2013.01); *H04W 72/0446* (2013.01)

(58) Field of Classification Search
None
See application file for complete search history.

(56) References Cited

U.S. PATENT DOCUMENTS

2010/0302983 A1* 12/2010 McBeath .............. H04L 5/0005
370/311
2013/0242904 A1 9/2013 Sartori et al.
(Continued)

OTHER PUBLICATIONS

European Patent Office Application Serial No. 17767001.5, Search Report dated Aug. 21, 2019, 6 pages.
(Continued)

*Primary Examiner* — Mohammad S Adhami
(74) *Attorney, Agent, or Firm* — Lee, Hong, Degerman, Kang & Waimey

(57) ABSTRACT

A method for receiving, by a terminal, control information in a wireless communication system, according to one embodiment of the present invention, comprises: receiving search space information for a self-contained subframe having all of a downlink control symbol, a data symbol, and an uplink control symbol; determining control channel candidates in the downlink control symbol of the self-contained subframe on the basis of the search space information; and searching for downlink control information of the terminal from the determined control channel candidates, wherein the determined control channel candidates constitute at least two or more search spaces on the downlink control symbol, and the terminal can search for the downlink control information assuming a transmission scheme specific to a search space to which each control channel candidate belongs.

15 Claims, 16 Drawing Sheets

(56) References Cited

U.S. PATENT DOCUMENTS

| | | | |
|---|---|---|---|
| 2013/0250880 A1* | 9/2013 | Liao | H04W 72/042 370/329 |
| 2014/0269595 A1 | 9/2014 | Lee et al. | |
| 2015/0271788 A1 | 9/2015 | Kim et al. | |
| 2017/0134880 A1* | 5/2017 | Rico Alvarino | H04L 5/0053 |
| 2017/0332359 A1* | 11/2017 | Tsai | H04B 7/0617 |
| 2018/0019842 A1* | 1/2018 | Fu | H04L 1/1854 |
| 2019/0069314 A1* | 2/2019 | Takeda | H04W 72/04 |
| 2019/0074944 A1* | 3/2019 | Kishiyama | H04L 5/0048 |

OTHER PUBLICATIONS

Levanen, T. et al., "Dense Small-Cell Networks: Rethinking the Radio Interface Beyond LTE-Advanced," 2014 1st International Conference on 5G for Ubiquitous Connectivity (5GU), XP032735039, Feb. 2015, 7 pages.

PCT International Application No. PCT/KR2017/002845, Written Opinion of the International Searching Authority dated Jun. 15, 2017, 14 pages.

Huawei, et al., "Remaining details for M-PDCCH search space design and TP for 36.211 and 36.213", 3GPP TSG RAN WG1 Meeting #84, R1-160309, Feb. 2016, 5 pages.

No, Tae Gyun et al., "Low-Latency Technologies and Standardization for 5G Mobile Communications", Electronics and Telecommunications Trends, vol. 31, No. 1, Feb. 2016, 10 pages.

Huawei, et al., "NB-PDCCH search space", 3GPP TSG RAN WG1 Meeting #84, R1-160320, Feb. 2016, 6 pages.

Smee, John, "5G Vision and Design", Qualcomm Technologies Inc., IEEE 5G Summit Silicon Valley, Nov. 2015, 22 pages.

* cited by examiner (a)

(b)

(a)

(b)

(a) Different REG-to-CCE mapping for localized and distributed (b) Different CCE-to-PDCCH mapping for localized and distributed

METHOD FOR TRANSMITTING AND RECEIVING CONTROL INFORMATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/002845, filed on Mar. 16, 2017, which claims the benefit of U.S. Provisional Application No. 62/309,435, filed on Mar. 16, 2016, and 62/455,553, filed on Feb. 6, 2017, the contents of which are all hereby incorporated by reference herein in their entireties.

TECHNICAL FIELD

The present invention relates to a wireless communication system, and more particularly, to a method for transmitting or receiving downlink control information of a user equipment (UE) at a downlink control symbol of a subframe and an apparatus therefor.

BACKGROUND ART

As more communication devices require greater communication capacity, the need of mobile broadband communication more enhanced than the conventional radio access technology (RAT) has been issued in a next generation communication system discussed recently. Also, massive Machine Type Communications (MTC) technology that provides various services anywhere and at any time by connecting a plurality of devices and things is one of main issues which will be considered in next generation communication. Furthermore, considering service/UE susceptible to latency and reliability, Ultra-Reliable and Low Latency Communication (URLLC) has been discussed in a next generation communication system.

As described above, a new RAT considering eMBB, mMTC and URLCC has been discussed for next generation wireless communication.

DISCLOSURE

Technical Problem

An object of the present invention is to provide a method and apparatus for improving efficiency of control signaling in a new RAT.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, a method for receiving, by a user equipment (UE), control information in a wireless communication system according to one aspect of the present invention comprises receiving search space information on a self-contained subframe having all of a downlink control symbol, a data symbol, and an uplink control symbol; determining control channel candidates in the downlink control symbol of the self-contained subframe based on the search space information; and searching for downlink control information of the UE from the determined control channel candidates, wherein the determined control channel candidates constitute at least two search spaces on the downlink control symbol, and the UE may search for the downlink control information by assuming a transmission scheme specific to a search space to which each control channel candidate belongs.

To achieve the object of the present invention, a UE for receiving control information in a wireless communication system according to another aspect of the present invention comprises a receiver for receiving search space information on a self-contained subframe having all of a downlink control symbol, a data symbol, and an uplink control symbol; and a processor for determining control channel candidates in the downlink control symbol of the self-contained subframe based on the search space information and searching for downlink control information of the UE from the determined control channel candidates, wherein the determined control channel candidates constitute at least two search spaces on the downlink control symbol, and the processor searches for the downlink control information by assuming a transmission scheme specific to a search space to which each control channel candidate belongs.

To achieve the object of the present invention, a method for transmitting, by a base station, control information in a wireless communication system according to other aspect of the present invention comprises transmitting search space information on a self-contained subframe having all of a downlink control symbol, a data symbol, and an uplink control symbol; mapping downlink control information of the UE into one of control channel candidates indicated through the search space information; and transmitting the downlink control information to the UE, wherein the control channel candidates constitute at least two search spaces on the downlink control symbol, and the base station maps and transmits the downlink control information by considering a transmission scheme specific to a search space to which each control channel candidate belongs.

The transmission scheme specific to the search space may be one of a transmission diversity scheme and a UE-dedicated beamforming scheme.

The at least two search spaces may be configured by applying different control channel element (CCE) indexing methods to one control resource set configured in the downlink control symbol.

At least one of a resource mapping scheme of the downlink control information, reference signal configuration for demodulation of the downlink control information, a physical resource block (PRB) bundling size, CCE aggregation levels and the number of control channel candidates corresponding to each of the CCE aggregation levels may be configured as a parameter specific to the search space through the search space information.

The UE may search for the downlink control information by assuming 2-port reference signal transmission and distributed resource mapping of the downlink control information when the transmission scheme specific to the search space is the transmission diversity scheme, and may search for the downlink control information by assuming 1-port reference signal transmission and localized resource mapping of the downlink 1-port reference signal transmission and localized resource mapping of the downlink control information are used when the transmission scheme specific to the search space is the UE-dedicated beamforming scheme.

One of the at least two search spaces may be selected in accordance with a bandwidth supported by the UE or a type of the downlink control information to be searched by the UE.

The a total number of the control channel candidates may be determined based on blind detection capacity of the UE, and the determined total number of the control channel candidates may be distributed over the at least two search spaces in accordance with a size of each search space.

Advantageous Effects

According to one embodiment of the present invention, as a plurality of search spaces are configured on the same control resource set, scheduling flexibility of downlink control information may be improved. Also, as a transmission scheme specific to each search space is used, downlink control information may be transmitted more efficiently considering a radio channel environment.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, by which the technical idea of the present invention may be non-limited. Specific terminologies used in the following description are provided to help understand the present invention and the use of the terminologies can be modified to a different form within a scope of the technical idea of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
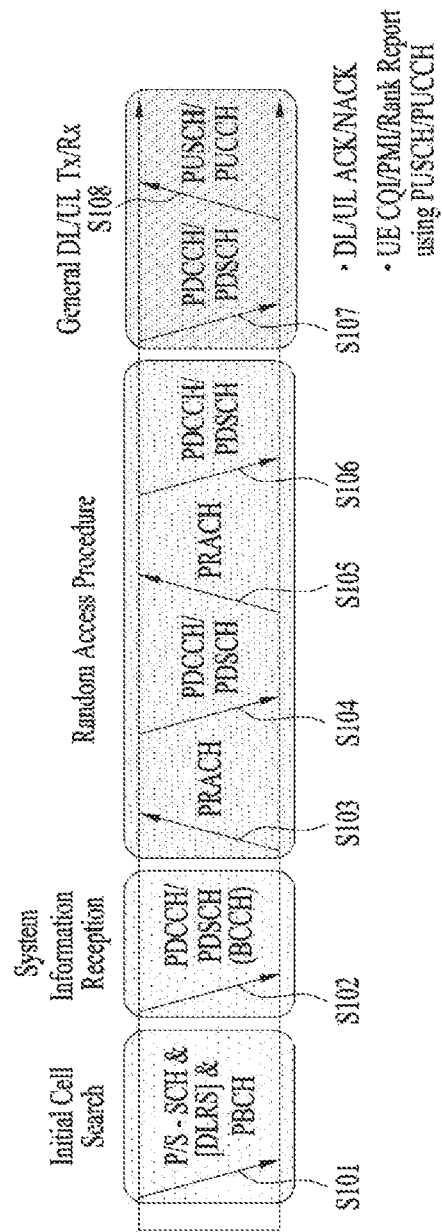
FIG. 1 is a diagram for explaining an example of physical channels used for 3GPP LTE/LTE-A system and a general signal transmission method using the same.

FIG. 1 is a diagram for explaining an example of physical channels used for 3GPP LTE/LTE-A system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the eNB, may match synchronization with the eNB and may then obtain information such as a cell ID and the like. Subsequently, the user equipment may receive a physical broadcast channel (PBCH) from the eNB and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Meanwhile, the user equipment may be able to perform a random access procedure to complete the access to the eNB

[S103 to S106]. To this end, the user equipment may transmit a preamble via a physical random access channel (PRACH) [S103] and may be then able to receive a response message via PDCCH and a corresponding PDSCH in response to the preamble [S104]. In case of a contention based random access, it may be able to perform a contention resolution procedure such as a transmission [S105] of an additional physical random access channel and a channel reception [S106] of a physical downlink control channel and a corresponding physical downlink shared channel.

Having performed the above mentioned procedures, the user equipment may be able to perform a PDCCH/PDSCH reception [S107] and a PUSCH/PUCCH (physical uplink shared channel/physical uplink control channel) transmission [S108] as a general uplink/downlink signal transmission procedure. Control information transmitted to an eNB by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
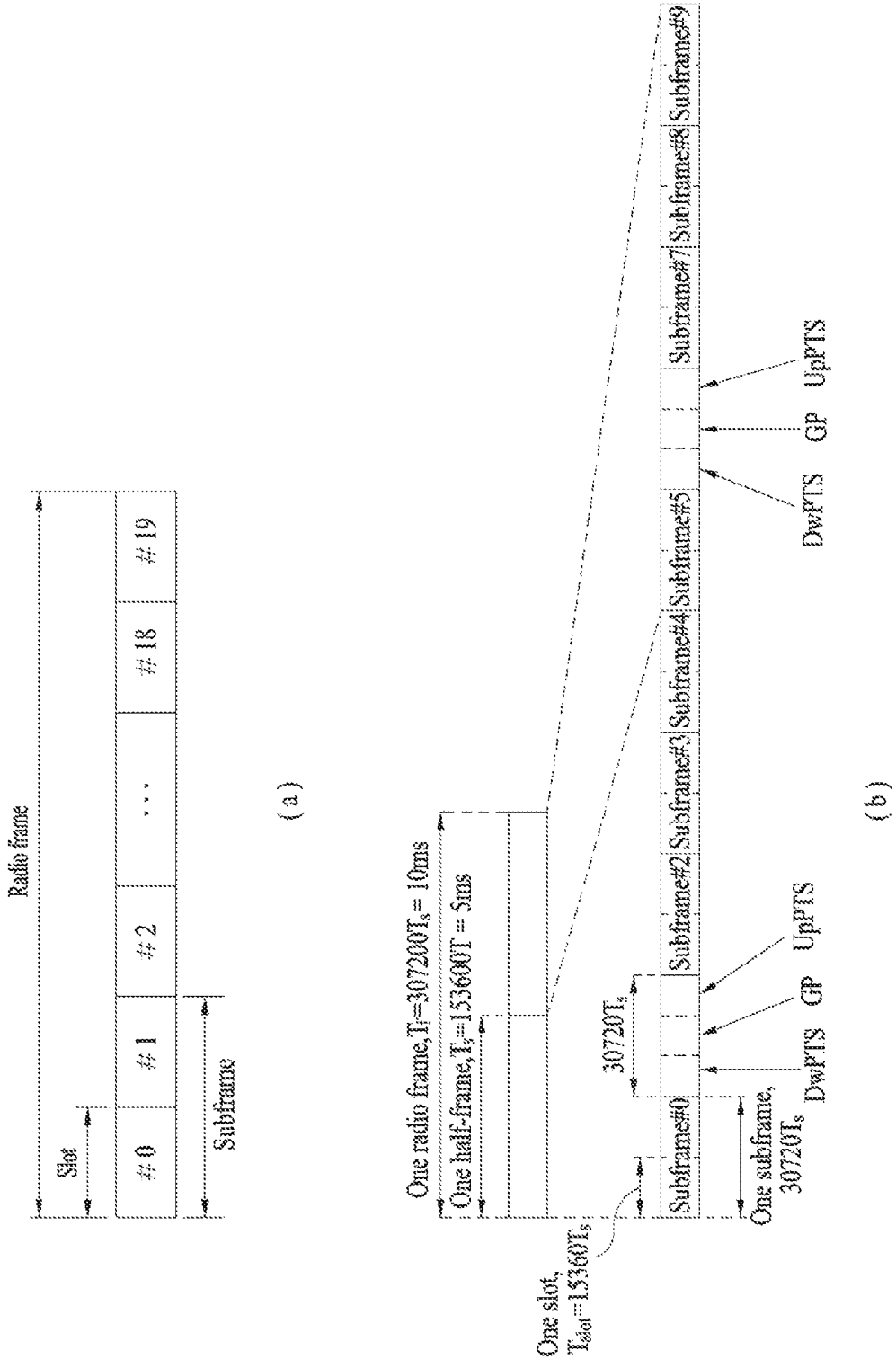
FIG. 2 is a diagram for explaining an example of a structure of a radio frame for 3GPP LTE/LTE-A system.

FIG. 2 is a diagram for explaining an example of a structure of a radio frame. Referring to FIG. 2, UL/DL (uplink/downlink) data packet transmission is performed by a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2 (b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a user equipment. The UpPTS is used for channel estimation in an eNB and uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
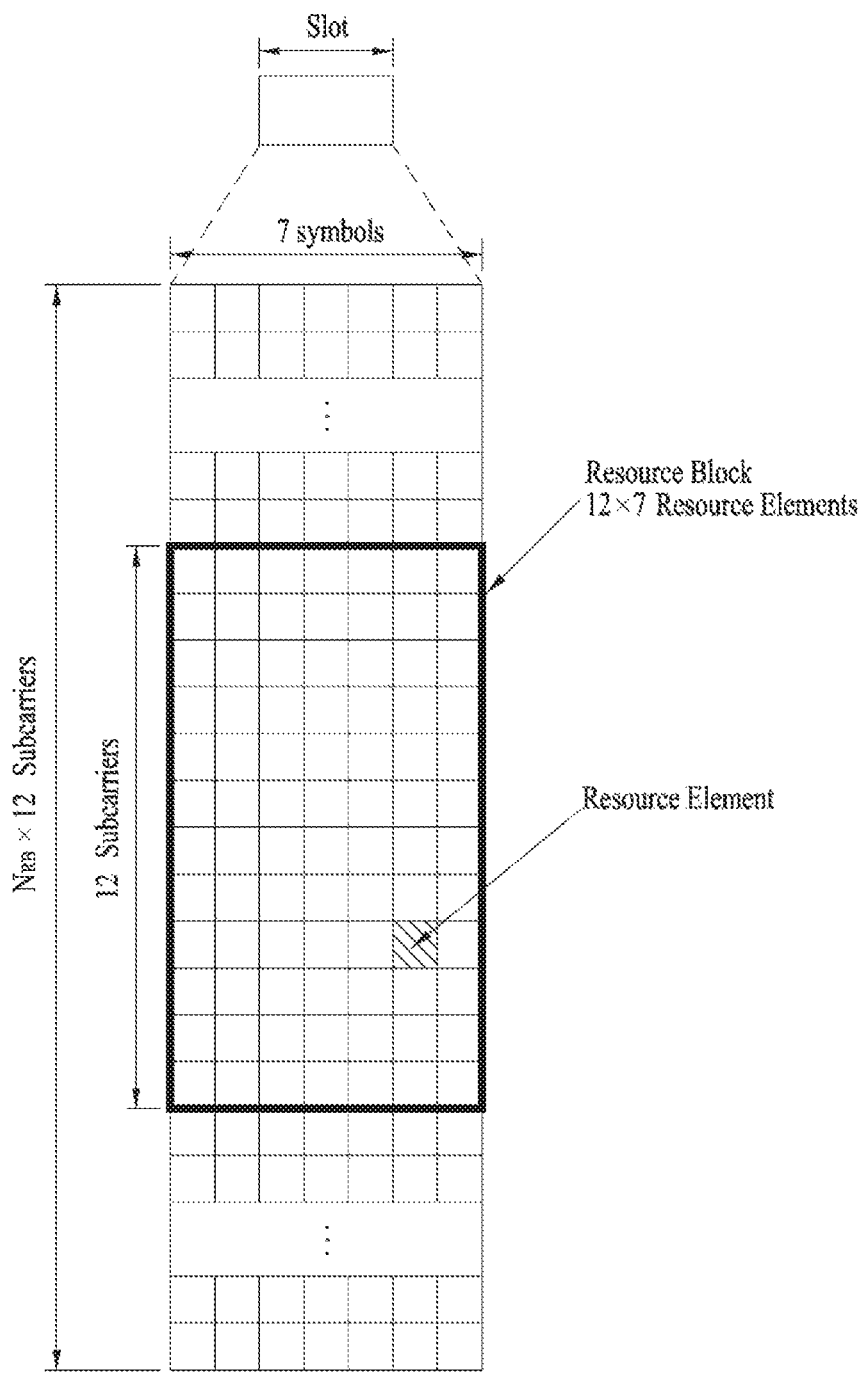
FIG. 3 is a diagram for one example of a resource grid for a downlink slot for 3GPP LTE/LTE-A system.

FIG. 3 is a diagram for one example of a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and OFDM symbol is replaced by SC-FDMA symbol.

Figure 4:
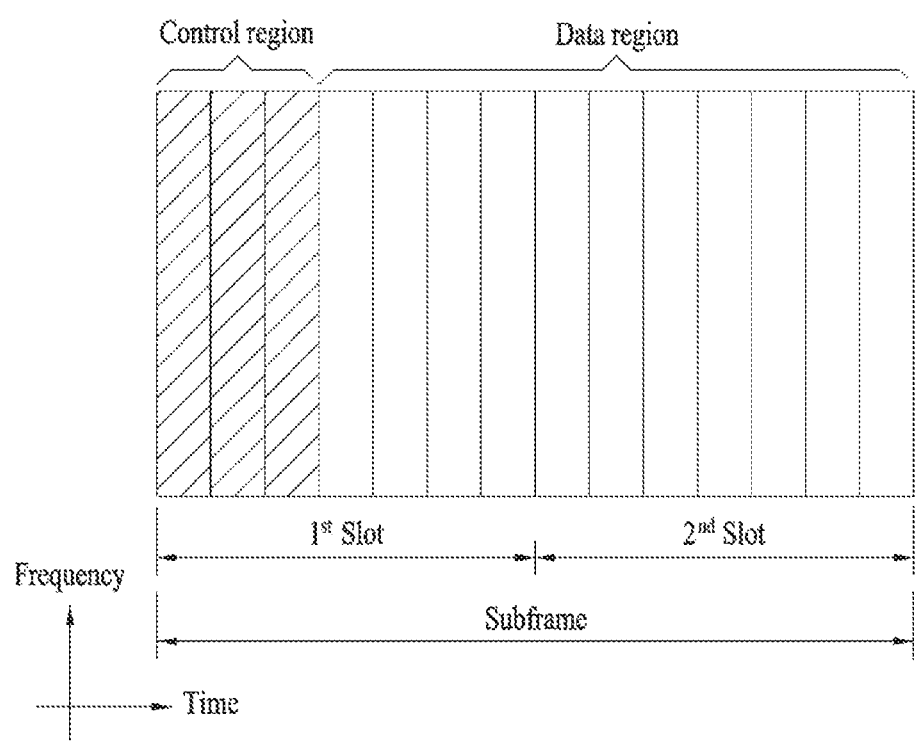
FIG. 4 is a diagram for a structure of a downlink subframe for 3GPP LTE/LTE-A system.

FIG. 4 is a diagram for an example of a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/

DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Control channel elements (CCEs), which are contiguous logical allocation units, are used in mapping a PDCCH to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH, it is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is a set of candidate PDCCHs composed of CCEs which the UE needs to attempt to decode at an aggregation level. Each aggregation level and the corresponding number of candidate PDCCHs may be defined as shown in Table 2.

TABLE 2

| Search space | | Number of PDCCH candidates |
|---|---|---|
| Aggregation level | Size (in CCE units) | |
| UE-specific | | |
| 1 | 6 | 6 |
| 2 | 12 | 6 |
| 4 | 8 | 2 |
| 8 | 16 | 2 |
| Common | | |
| 4 | 16 | 4 |
| 8 | 16 | 2 |

As shown in Table 2, there are 4 aggregation levels, and the UE has a plurality of search spaces according to the aggregation levels. The search spaces may be divided into a UE-specific search space (USS) and a common search space (CSS), as shown in Table 2. The UE-specific search space is for specific UEs. Each UE may check an RNTI and CRC with which the PDCCH is masked, by monitoring the UE-specific search space thereof (attempting to decode a PDCCH candidate set according to a possible DCI format) and acquire control information if the RNTI and CRC are valid.

The CSS is intended for use in the case in which a plurality of UEs or all UEs need to receive PDCCHs, as in the cases of system information dynamic scheduling and paging messages. The CSS may be used for a specific UE in terms of resource management. Furthermore, the CSS may overlap the USS.

Specifically, the search space may be determined by Equation 1 given below.

$$L\{(Y_k+m') \bmod \lfloor N_{CCE,k}/L \rfloor\}+i \qquad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)} \cdot n_{CI}$ and otherwise, m'=m. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, . . . , L−1. For the CSS, $Y_k$ is always determined to be 0.

Figure 5:
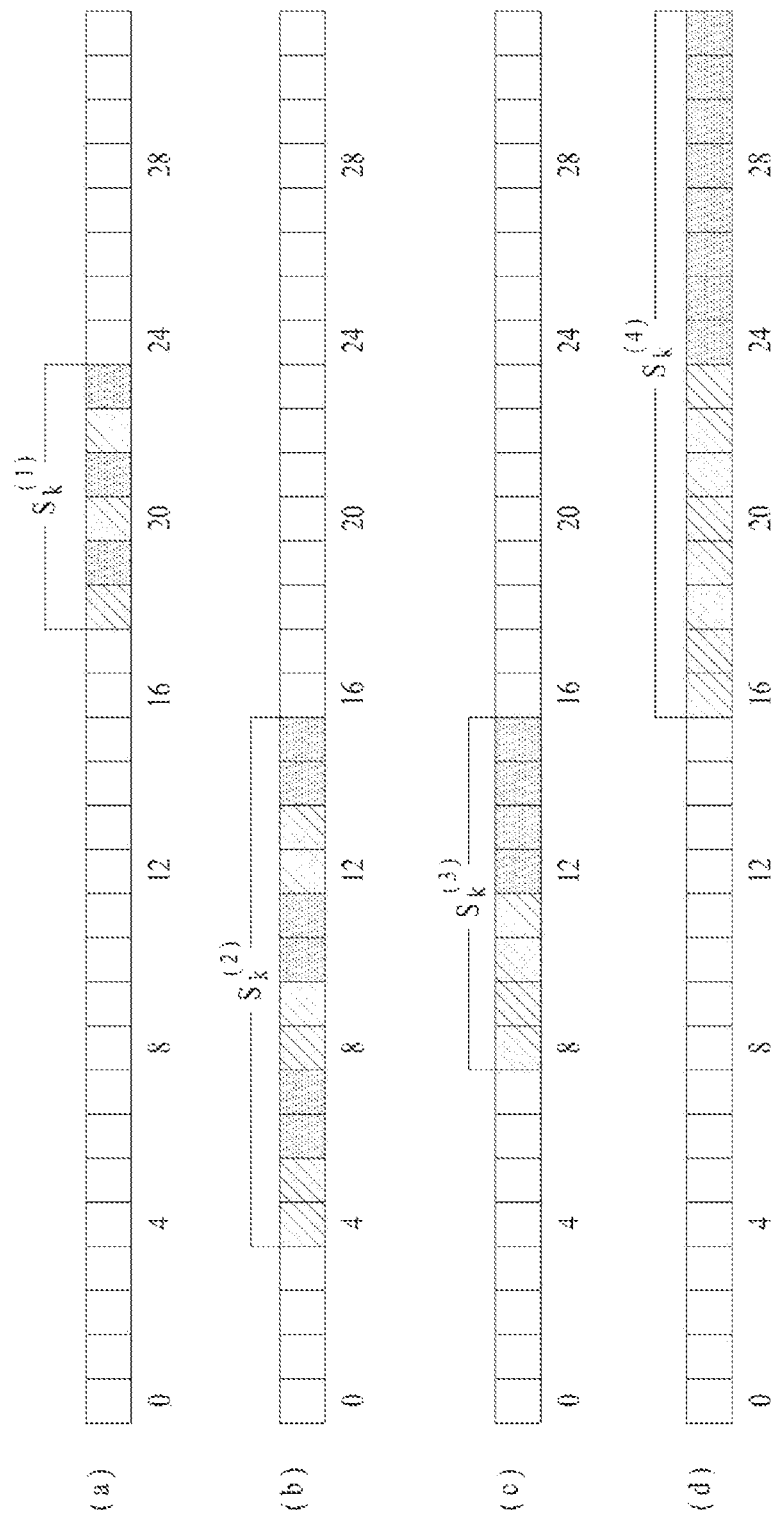
FIG. 5 is a diagram for a search space for 3GPP LTE/LTE-A system.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined for a UE at the respective aggregation levels in the same subframe according to the modulo function and L. The start CCE is always determined to correspond to a multiple of the corresponding aggregation level due to L. In the description given below, $Y_k$ is exemplarily assumed to be CCE number 18. The UE attempts to sequentially decode the CCEs starting with the start CCE in units of CCEs determined for a corresponding aggregation level. In FIG. 5(b), for example, The UE attempts to decode the CCEs two by two, starting with CCE 4, which is the start CCE, according to the aggregation level.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times in the CSS, in consideration of two DCI sizes (DCI formats 0/1A/3/3A and DCI format 1C) for each of six PDCCH candidates. In the USS, the UE needs to attempt to perform decoding up to 32 times, in consideration of two DCI sizes for each of 16 (6+6+2+2=16) PDCCH candidates. Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Figure 6:
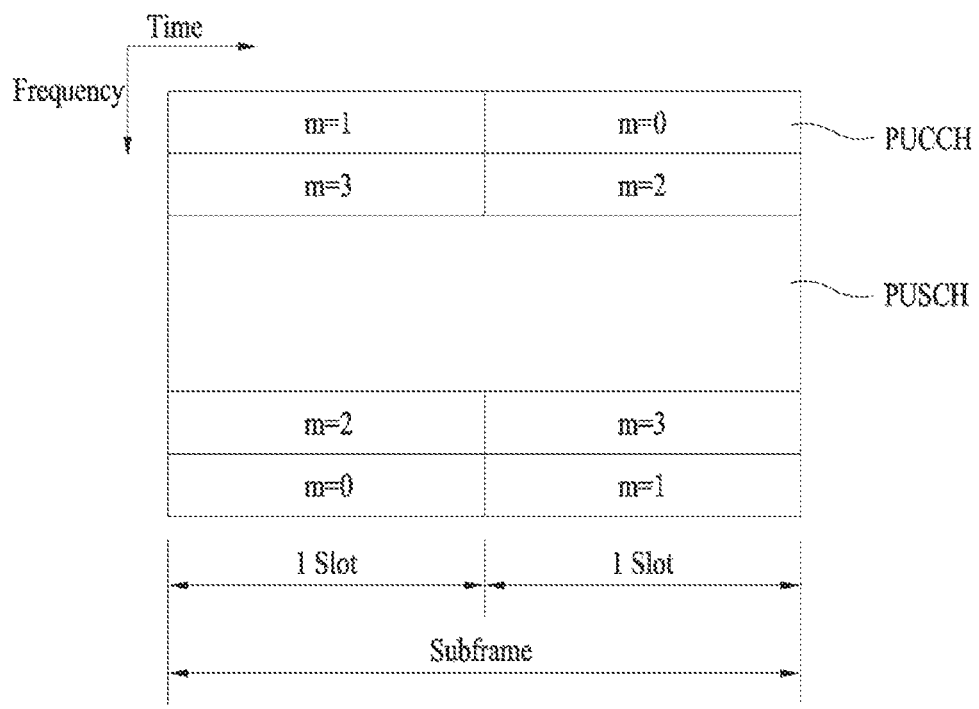
FIG. 6 is a diagram for a structure of an uplink subframe for 3GPP LTE/LTE-A system.

FIG. 6 is a diagram for an example of a structure of an uplink subframe.

Referring to FIG. 6, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes a RB pair situated at the both ends of the data region on a frequency axis and hops on a slot boundary.

The PUCCH can be used for transmitting control information such as SR(Scheduling Request), HARQ-ACK and/ or CSI (Channel State Information)s.

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include: i) a demodulation-reference signal (DM-RS) for channel estimation for coherent demodulation of information transmitted over a PUSCH and a PUCCH, and ii) a sounding reference signal (SRS) allowing the BS to measure UL channel quality at frequencies for different networks.

The DL RSs include: i) a cell-specific reference signal (CRS) shared by all UEs in a cell; ii) a UE-specific reference signal for a specific UE; iii) a demodulation-reference signal (DM-RS) transmitted for coherent demodulation in the case of transmission of a PDSCH; iv) a channel state information-reference signal (CSI-RS) for delivering channel state information (CSI) in the case of transmission of a DL DMRS; v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes of acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

Figure 7:
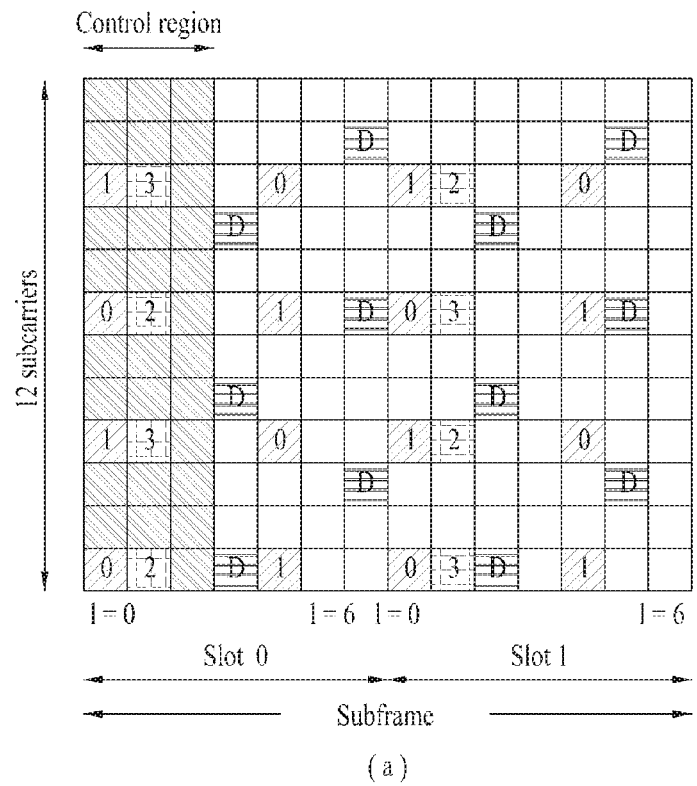
FIG. 7 is a diagram for a reference signal for 3GPP LTE/LTE-A system.
Figure 7:
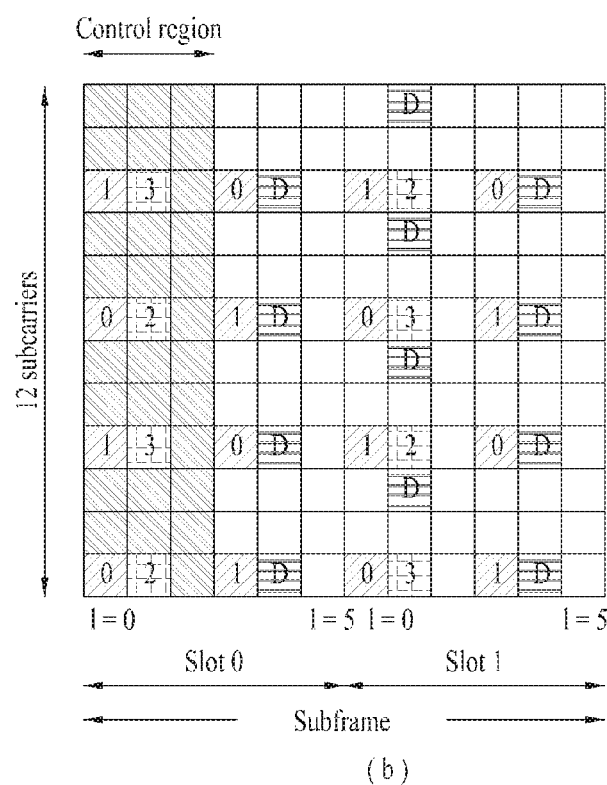

FIG. 7 is a diagram illustrating a pattern in which CRSs and DRSs defined in legacy 3GPP LTE (e.g., Release-8) are mapped to resource block (RB) pairs. A downlink RB pair, a unit in which an RS is mapped, may be represented as a unit of one subframe in the time domain times 12 subcarriers in the frequency domain. That is, one RB pair has a length of 14 OFDM symbols for a normal CP (FIG. 7(a)) and a length of 12 OFDM symbols for an extended CP (FIG. 7(b)).

FIG. 7 shows locations of RSs on RB pairs in a system with a BS supporting four transmit antennas. In FIG. 7, resource elements (REs) marked "0", "1", "2" and "3" represent the locations of the CRSs for antenna port indexes 0, 1, 2 and 3, respectively. In FIG. 7, REs denoted by "D" represent locations of the DMRSs.

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

The New RAT system uses an OFDM transmission scheme or a similar transmission scheme and may have OFDM numerology as shown in Table 3, for example.

TABLE 3

| Parameter | Value |
| --- | --- |
| Subcarrier-spacing (Δf) | 75 kHz |
| OFDM symbol length | 13.33 us |
| Cyclic Prefix (CP) length | 1.04 us/0/94 us |
| System BW | 100 MHz |
| No. of available subcarriers | 1200 |
| Subframe length | 0.2 ms |
| Number of OFDM symbol per Subframe | 14 symbols |

Self-Contained Subframe

Figure 8:
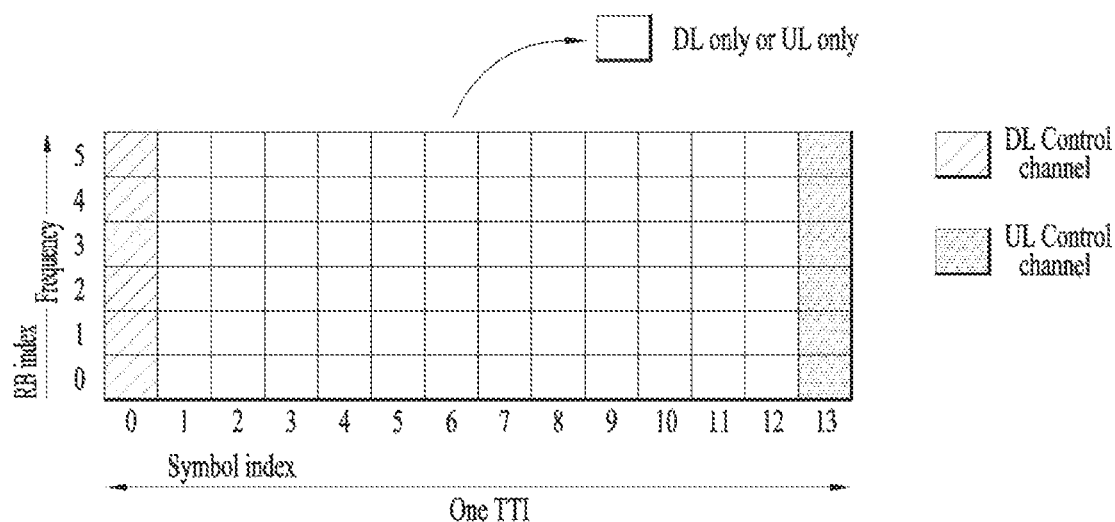
FIG. 8 is a diagram illustrating a structure of a self-contained subframe according to one embodiment of the present invention.

FIG. 8 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 8, oblique line areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response in accordance with processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows an eNB and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 8 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ(wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

The Self-contained subframe may be categorized into DL Self-contained subframe (hereinafter, DL subframe) and UL Self-contained subframe (hereinafter, UL subframe) in accordance with a direction of data transmitted at the corresponding subframe.

Figure 9:
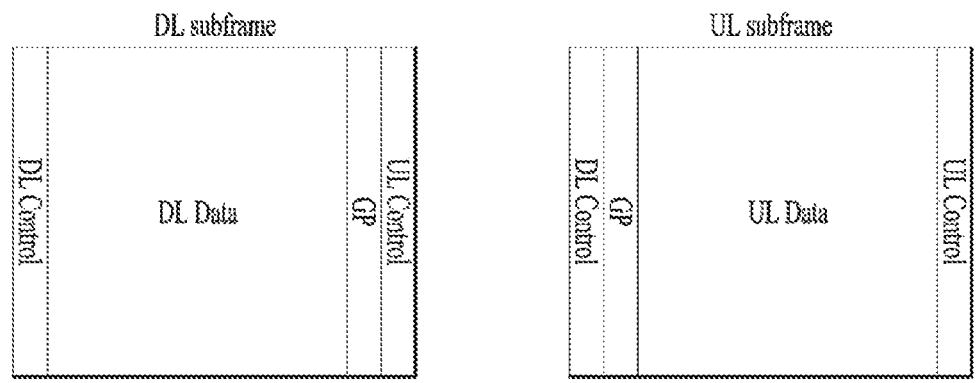
FIG. 9 is a diagram illustrating a downlink self-contained subframe and an uplink self-contained subframe according to one embodiment of the present invention'

FIG. 9 is a diagram illustrating a DL subframe and a UL subframe according to one embodiment of the present invention.

Referring to FIG. 9, the GP is located at the time when DL is switched to UL. For example, the GP is located between the DL data region and the UL control region at the DL subframe, and is located between the DL control region and the UL data region at the UL subframe.

The GP may include Tx/Rx switching time of the eNB/UE and a timing advance (TA) for UL transmission of the UE.

Search Space Configuration for New RAT

As described above, according to the legacy LTE PDCCH, a common search space and a UE-specific search space exist as search spaces configured for control signaling (e.g., DCI transmission). In each search space, the UE may detect system information and/or UE-specific control signaling.

The UE may assume that an antenna port used for control signaling is the same as an antenna port used for transmission (e.g., master information block transmission) of a physical broadcasting channel (PBCH). If two or more antenna ports are used for PBCH transmission, the PDCCH is transmitted in accordance with a transmission diversity scheme, for example, a spatial frequency block coding (SFBC) scheme. That is, a transmission scheme of the PDCCH is determined in accordance with the number of antenna ports.

Although it is general that throughput improvement according to diversity gain is expected if control information is transmitted in accordance with a transmission diversity scheme, gain according to beamforming may be greater than transmission diversity gain in case of a specific environment, for example, in the case that a channel is little changed and the eNB can identify a channel state based on a feedback from the UE.

Considering this, in one embodiment of the present invention, a method for configuring a search space for each of various transmission schemes or performing a plurality of blind detections (e.g., blind detection is attempted per transmission scheme) for the same control channel candidate will be suggested. As a result, a transmission scheme of a control channel may have configurability, and may be determined adaptively to a radio channel environment.

Meanwhile, identification different search spaces configured for New RAT is not limited to the transmission scheme of the control channel. For example, different search spaces may be configured for more efficient control signaling in accordance with a type or capability of the UE.

Before description of the embodiments of the present invention, a concept of terms which will be used will be described briefly. However, the present invention is not restricted to titles of the terms and the corresponding concept may be referred to as or defined as another title having an equivalent meaning.

Control Channel Element (CCE): may mean a minimum unit for control information transmission. Although the control information may be transmitted by only one CCE, the control information may be transmitted by aggregation of a plurality of CCEs. Meanwhile, the CCE may be expressed by aggregation of resources (e.g., Resource Element Group, REG) smaller than CCE. For example, one CCE may be expressed as a predetermined number of aggregated REGs. Alternatively, one CCE may be defined as a set of available resources (e.g., REs or REGs into which control information may be mapped) included in a frequency band (e.g., one RB) of a certain size.

Control symbol: may mean symbol (s) (e.g., resource of a time domain) into which control information is mapped on a resource grid. The control symbol may be a subset of a control region (or control resource set).

Control region: may mean a resource (or resource unit) in which a search space is configured. As an example of the present invention, if a plurality of control regions exist, CCE indexing may be performed independently per control region. Meanwhile, the control region may be referred to as a control subband or a control resource set (CORESET), and these terms may be used together.

Search space (SS): means a set of control channel candidates comprised of CCEs (e.g., CCE group) in a control region (or control resource set). A UE which desires to detect control information from the corresponding SS may attempt detection for all control channel candidates which belong to the SS. In this case, a set of control channel candidates for which the UE should attempt blind detection may be defined as a search space.

In view of each UE, one SS may be configured in one control region. Meanwhile, a plurality of SSs may be configured even in the same control region (or control resource set). As different control channel candidates are configured by different CCE combinations, different SSs may be configured even in the same control region (or control resource set). For example, when it is assumed that a first SS and a second SS are configured in the same control region (or control resource set), the UE may configure a control channel candidate based on a first CCE combination scheme in the first SS, and may configure a control channel candidate based on a second CCE combination scheme. The first CCE combination scheme and the second CCE combination scheme are not limited to a simple difference between CCE aggregation levels. Even though the same number of CCEs are selected as control channel candidates, the position of the selected CCEs may be varied depending on a CCE combination scheme. As a detailed example, CCE indexing method may be different per SS. Even in case of the same CCE, an index of the corresponding CCE may have a first value in the first SS, and an index of the corresponding CCE may have a second value in the second SS. As another method, a starting CCE index of each control channel candidate which belongs to its respective SS may be configured independently, or a resource mapping scheme (localized/distributed) constituting each channel candidate may be configured independently.

In other words, configuration of a plurality of SSs in the same control region (or control resource set) may be interpreted that a plurality of SSs which include the same aggregation level exist.

Also, the SS may be subjected to hopping per certain time unit. For example, A CCE combination constituting control channel candidates may be changed per subframe.

[Identification of a Plurality of SSs]

The following description illustrates a reference for identifying a plurality of SSs. Index given to each embodiment is for convenience of description, and each embodiment does not configure an independent invention necessarily. Therefore, examples having different indexes may be configured in combination. Also, if only one SS is defined in each control region (or control resource set) and a plurality of control regions are configured, the SS may be replaced with a control region (or control resource set) in the following description.

Example 1) SS Identification According to Transmission Scheme

A transmission scheme may be configured independently per SS. For example, control information may be transmitted from the first SS in accordance with a first transmission scheme (e.g., transmission diversity scheme), and control information may be transmitted from the second SS in accordance with a second transmission scheme (e.g., beamforming scheme). However, independent configuration of the transmission scheme in the first SS and the second SS is not limited to the case that the transmission schemes of the first SS and the transmission schemes of the second SS are necessarily different from each other.

A network (e.g., eNB) may determine a transmission scheme which will be applied to each SS, and may signal the determined transmission scheme to the UE (e.g., system information such as MIB and SIB or RRC signaling). Therefore, the UE may receive control information by assuming a transmission scheme corresponding to SS when attempting detection of control information from the SS.

(i) SS based on transmission diversity scheme: if the network cannot know channel information (e.g., CSI) on the UE, or reliability on the channel information is low, it is preferable to transmit control information in accordance with a transmission diversity scheme to improve reliability (i.e., diversity gain) for control information transmission. To this end, the SS for the transmission diversity scheme may be defined. As the transmission diversity scheme, spatial frequency block coding (SFBC), beam cycling or random beamforming may be used. SFBC may be 2-antenna port SFBC, for example. Beam cycling may be 2-port beam cycling of RB level or RE level or 1-port beam cycling of RB level. According to a beam cycling scheme, control information is transmitted by circulation of beams in various directions. Since the UE receives control information through beams of different directions, diversity gain is generated. For example, according to the 2-port beam cycling scheme, a first port and a second port simultaneously transmit control information through beams of different directions. Afterwards, the first port and the second port transmit the corresponding control information through beams of different directions. Hereinafter, for convenience of description, it is assumed that SFBC is mainly used as the transmission diversity scheme. However, another transmission diversity scheme may be used.

(ii) SS based on beamforming scheme: if the eNB acquires channel information (e.g., CSI) on the UE through a feedback from the UE, the eNB may transmit control information by forming beams suitable for the corresponding UE. Although 1-port beam scheme may be assumed as a beamforming scheme, beamforming of 2 ports or more may be used in accordance with a rank of the channel According to the 1-port beamforming, as the same data (e.g., 1 layer) is mapped into 1 antenna port (e.g., digital/logical antenna port) and 1 by N sized beamforming weight matrix is applied to 1 logical antenna port, one layer on the one logical antenna port is mapped into N physical antennas. Therefore, one-layer is transmitted through beams formed through N physical antennas, and beamforming gain is generated. If the eNB determines a beamforming weight matrix, since it determines a direction of beams, the eNB should know channel information on the UE. A precoding matrix of a codebook which is previously defined may be reused as a beamforming weight matrix.

Example 2) SS Identification According to Type of Control Signal

The SSs may be identified in accordance with a type of a control signal (or control information). The network may indicate, to the UE, the SSs configured in accordance with the type of the control signal by using system information (e.g., MIB, SIB) or RRC signaling. The control signal may be classified into the following types, and the SSs may be identified with respect to some or all of the types listed as follows.

(i) Downlink Control Information

UL grant: UL resource information, UL transmission related information such as CQI request DL assignment: information related to DL data transmission (e.g., resource allocation, MCS, HARQ, precoding related information)

(ii) Common/UE-Dedicated Signal

Cell-common signaling (e.g., system information such as SIB)

Group common signaling

UE-dedicated RRC signal

Although the same transmission scheme may be applied to different SSs identified in accordance with Example 2, different transmission schemes may be applied to different SSs identified in accordance with Example 2 in association with Examples 1 and 2.

For example, if different SSs are identified in accordance with a type of DCI, different transmission schemes may be applied to each of DL assignment and UL grant. For example, the UE may attempt detection for DL assignment in the first SS by assuming the first transmission scheme and attempt detection for UL grant in the second SS by assuming the second transmission scheme.

In more detail, the beamforming scheme may be applied to the first SS where DL assignment is mapped/detected, and the transmission diversity scheme may be applied to the second SS where UL grant is mapped/detected. For example, if channel information on the UE is insufficient or inexact, the network may indicate, to the UE, to transmit aperiodic CSI report by activating a CSI request field included in UL grant. In this way, when the network transmits UL grant indicating CSI transmission, since it is not preferable that beamforming is performed based on insufficient or inexact channel information, UL grant may be transmitted using a transmission diversity scheme (e.g., SFBC) that may obtain transmission diversity gain. After the network acquires channel information on the UE, the network may transmit DL assignment in accordance with a beamforming scheme. The network may signal SS for UL grant and SS for DL assignment. The network may select SS in accordance with a type of DCI to be detected by itself and perform blind detection of DL assignment of UL grant by assuming the transmission scheme corresponding to the selected SS.

As another example, each SS may be identified in accordance with a signaling scheme of a control signal or a target of the control signal, and different transmission schemes may be applied to each SS. For example, since beamforming performed for a specific UE through cell-common signaling such as system information is not proper, the cell-common signal may be transmitted from the SS based on the transmission diversity. Otherwise, UE-dedicated RRC signal or UE-specific signal (e.g., DCI) may be transmitted from the SS based on beamforming. Otherwise, the transmission diversity scheme may be used for the UE-specific signaling without limitation to beamforming.

Example 3) SS Identification According to UE Type

In 5G (e.g., New RAT), a system bandwidth may be increased more greatly than the LTE (e.g., 200 MHz), and various types of UEs may coexist. For example, a wideband UE (WB-UE) for supporting wide bandwidth transmission and reception and a narrowband UE (NB-UE) which may use some of a full system bandwidth may coexist.

Considering various types of UEs as above, SS for a control signal may be configured per UE type. For example, the network may configure SS independent from another SS with respect to a specific resource (e.g., specific bandwidth). In detail, an entire control resource (e.g., control resource set) may be divided into a plurality of sub-resources (e.g., subset). The network may configure SS per sub-resource and restrict SS where blind detection of the control signal is performed in accordance with a UE type.

As another example, the network may restrictively configure SS in only a specific resource region, or may configure SS except a specific resource region. In detail, the network may configure NB-UE SS where NB-UE performs blind detection, in a specific control resource region. The network may configure WB-UE SS from the other resources except the NB-UE SS in configuring WB-UE SS where WB-UE performs blind detection. This may be interpreted that resource indexing (e.g., REG and CCE) is performed in a control region allocated to the WB-UE except the control region for which the NB-UE SS is configured and SS is configured based on the corresponding indexing. The NB-UE SS and the WB-UE SS may be identified/configured through the above method. Information on the NB-UE SS and/or the WB-UE SS may be indicated through system information (e.g., MIB and SIB) or RRC signaling.

[Resource Region or Control Resource Set for Configuring SS]

Examples for defining a plurality of SSs have been described as above, and a resource (control region or control resource set) where each SS is configured will be described. For example, the control region or the control resource set where each SS is defined may be indicated. As described above, the control region or the control resource set may be a unit for performing resource indexing, a channel candidate may be defined based on the corresponding index, and a set of channel candidates may be SS.

In the examples of resource configuration per SS, which will be described later, a plurality of SSs may be configured on their respective resource regions, or may be overlapped with at least a part of their resource regions.

Example A) Indication of Resource where Each SS is Configured in Frequency Domain The network may designate a control region (or control resource set) such that SS is defined in a specific frequency region, and may signal the designated control region to the UE.

If different SSs are defined on their respective control regions (or if a plurality of control regions are configured), resource indexing (e.g., REG and CCE) may be performed independently per control region. If resource indexing is varied per control region, it may be regarded that a method for mapping control information into resource is varied per control region.

Figure 10:
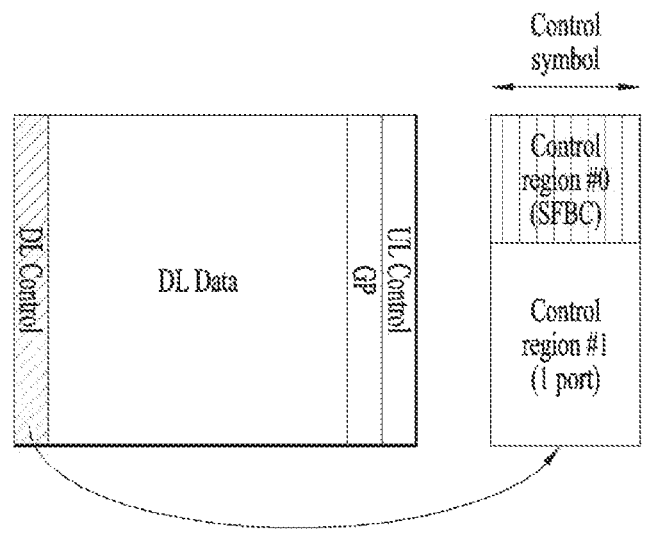
FIGS. 10 to 14 are diagrams illustrating control regions according to the embodiments of the present invention.

FIG. 10 illustrates a control region according to one embodiment of the present invention.

Although DL subframe is shown for convenience of description, the present invention is not limited to DL subframe, and a data region and a position of GP may be varied depending on data (e.g., DL/UL) which are transmitted. Also, although it is assumed that a control symbol is one symbol, the number of control symbols may be 2 or more at a DL/UL self-contained subframe. DL subframe of FIG. 10 illustrates that the SS identification method of the Example 1 is implemented by the Example A. However, the Example A may also be applied to the Examples 2 and 3.

Referring to FIG. 10, a control symbol is divided into two control regions in a frequency domain. SS #0 and SS #1 are respectively configured in a control region #1 and a control region #2. The SS may be configured on at least a part of the corresponding control region. The network may determine and signal a transmission scheme (or transmission scheme to be considered during blind detection of the UE) in each SS (or resource region). For convenience, it is assumed that the control region #0 is a region for transmitting and receiving control information transmitted in accordance with SFBC and the control region #1 is a region for transmitting and receiving control information transmitted in accordance with 1-port transmission scheme (e.g., 1-port beamforming scheme).

If the Example 1 and the Example 2 are applied together, 2-port transmission scheme (e.g., SFBC) is used for the control region #0, and the control region #0 is configured as a region for receiving UL grant in the UE. 1-port transmission scheme (e.g., UE dedicated beamforming) is used in the control region #1, and the control region #1 is configured as a region for receiving DL assignment in the UE. When detecting DCI corresponding to UL grant or DL assignment, the UE may detect the DCI by assuming the transmission scheme used in the SS on the corresponding control region.

Figure 11:
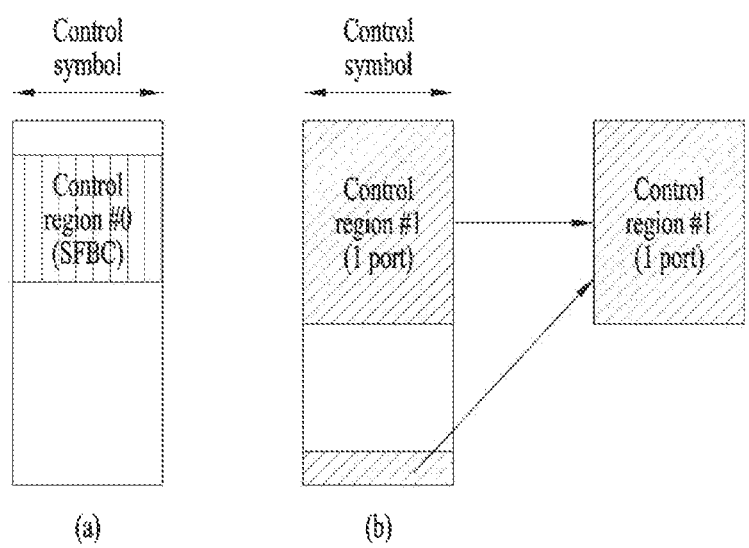

FIG. 11 illustrates a control region according to another embodiment of the present invention.

As shown in FIG. 11(a), the Example A may include that SS is configured in only a specific frequency domain of the same time unit (e.g., symbol or subframe) in the control region. Also, as shown in FIG. 11(b), the Example A may include that SS is not configured in a specific frequency domain of the same time unit (e.g., symbol or subframe) in the control region.

In FIG. 11, CCE indexing for control information transmission may be performed in only oblique regions. For example, although resources (e.g., oblique regions) constituting SS are spaced apart from each other on a frequency axis in FIG. 11(b), CCE indexing may be performed on the logical assumption that resources constituting SS are consecutive. Therefore, even though resources constituting SS are non-consecutive, CCE indexes are allocated consecutively and sequentially.

As another example, if resources constituting SS are non-consecutive, the oblique regions in FIG. 11(b) may respectively be defined by different control regions, whereby different SSs may be defined on their respective oblique regions. For example, if a specific frequency domain is configured so as not to be used as SS, the network may configure SS per control regions divided by the specific frequency domain and signal the configured SS to the UE.

Example B) Indication of Resource where Each SS is Configured in Time Domain

The network may designate a control region (or control resource set) such that different SSs are defined in different time regions (e.g., subsymbol(s), symbol(s), subframe, subframe set), and may signal the designated control region. For example, the control resource set and/or SS may be configured for each given time region. If different SSs are defined on their respective control regions, CCE indexing may be performed independently per control region. Resource mapping such as CCE indexing may be performed per control resource set.

Figure 12:
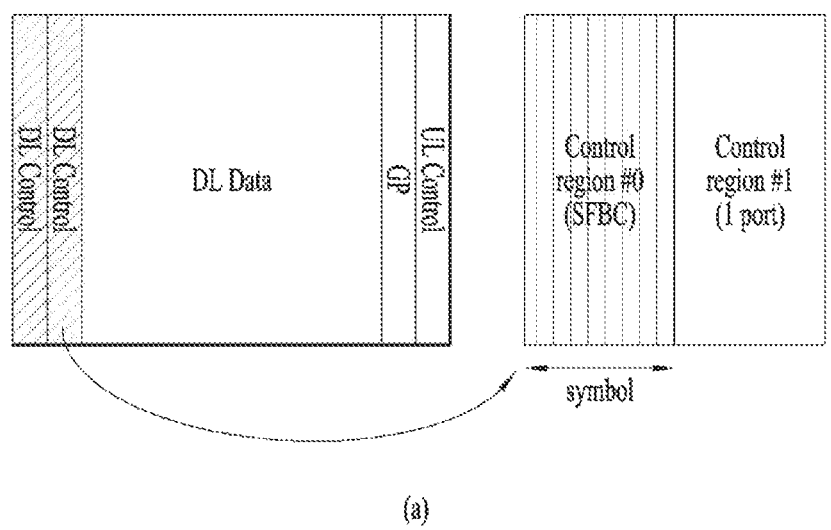
Figure 12:
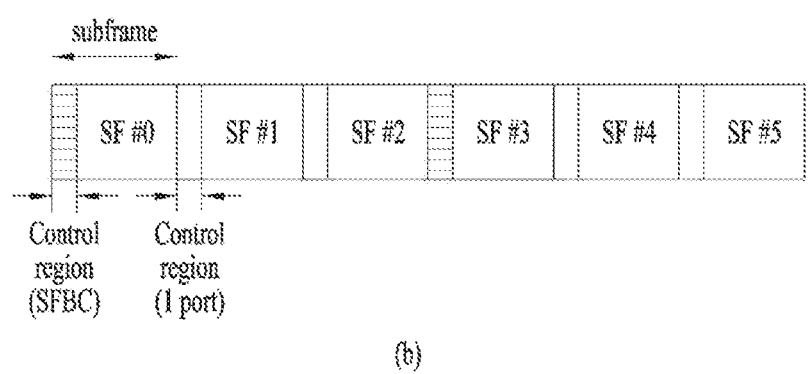

FIG. 12 illustrates a control region according to another embodiment of the present invention.

Referring to FIG. 12(a), two control symbols are included in DL subframe, and control regions corresponding to different transmission schemes per control symbol. For example, a control region for control information transmitted in accordance with a 2-port transmission scheme (e.g., SFBC) is configured in a control symbol 1, and a control region for control information transmitted in accordance with a 1-port transmission scheme (e.g., 1-port beamforming) may be configured in a control symbol 2.

The UE may attempt each control information detection with respect to two control symbols. In this case, the UE performs detection considering a transmission scheme corresponding to each control symbol. The UE may specify SS on a first control resource set where the first transmission scheme is configured, and may perform blind decoding by assuming the first transmission scheme on the SS.

FIG. 12(b) illustrates that a transmission scheme of control information is different per subframe (i.e., the same transmission scheme is used within one subframe), and one control symbol is assumed per subframe. A subframe specific transmission scheme is applied to the control region. The network may indicate, to the UE, a transmission scheme applied to the control region of each subframe (or subframe set). Alternatively, the UE may perform decoding for the control region by performing blind detection the transmission scheme of the control region per subframe.

Example C) Indication of Resource where Each SS is Configured Per Antenna Port (or in Layer Domain)

The network may designate a control region (or control resource set) such that different SSs are defined per antenna port, and may signal the designated control region. If different SSs are defined on their respective control regions, CCE indexing may be performed independently per control region. If a plurality of antenna ports are used, the network may configure different control regions per port or configure different control regions per port combination, whereby different SSs may be defined.

This may be interpreted that different SSs are defined per layer or layer combination if a plurality of layers are configured in the control region. For example, the network may signal or may previously be configured such that the WB-UE and the NB-UE may detect/decode control information by using different ports.

The Example C may be applied by combination with the Example A (or B). For example, the network configures a control region and SS for the WB-UE only in a port 1. The network may configure some frequency region of a port 2 as a control region and SS for the NB-UE only, and may configure a frequency region except an NB-UE control region as a WB-UE control region.

Figure 13:
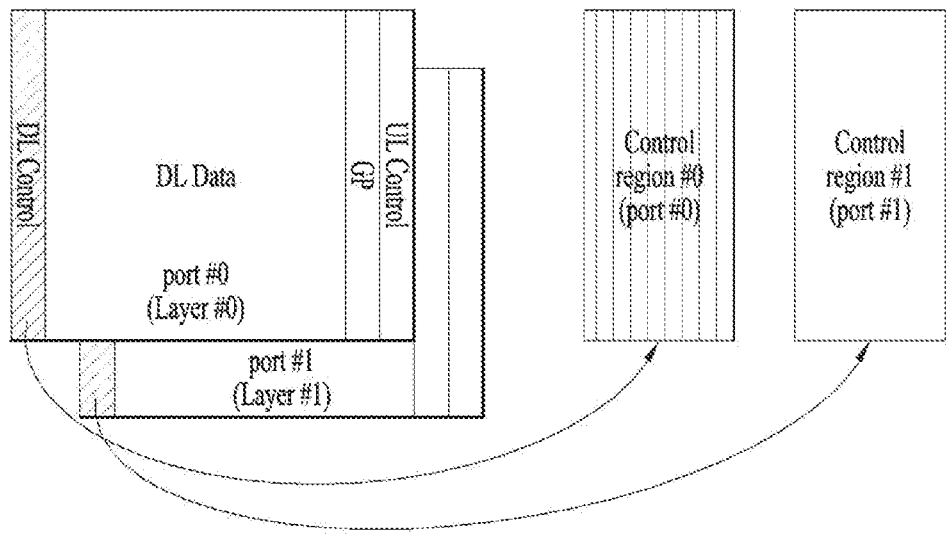

FIG. 13 illustrates a control region according to still another embodiment of the present invention.

Referring to FIG. 13, different SSs are defined in (the same) control symbol of different layers transmitted through different ports. This scheme may be used for MU-MIMO transmission of a control channel. For example, each UE may be configured to perform blind decoding for specific port(s) of a plurality of DMRS ports, and the network may perform MU-MIMO pairing for UEs, for which different ports are configured, on the same time-frequency.

Figure 14:
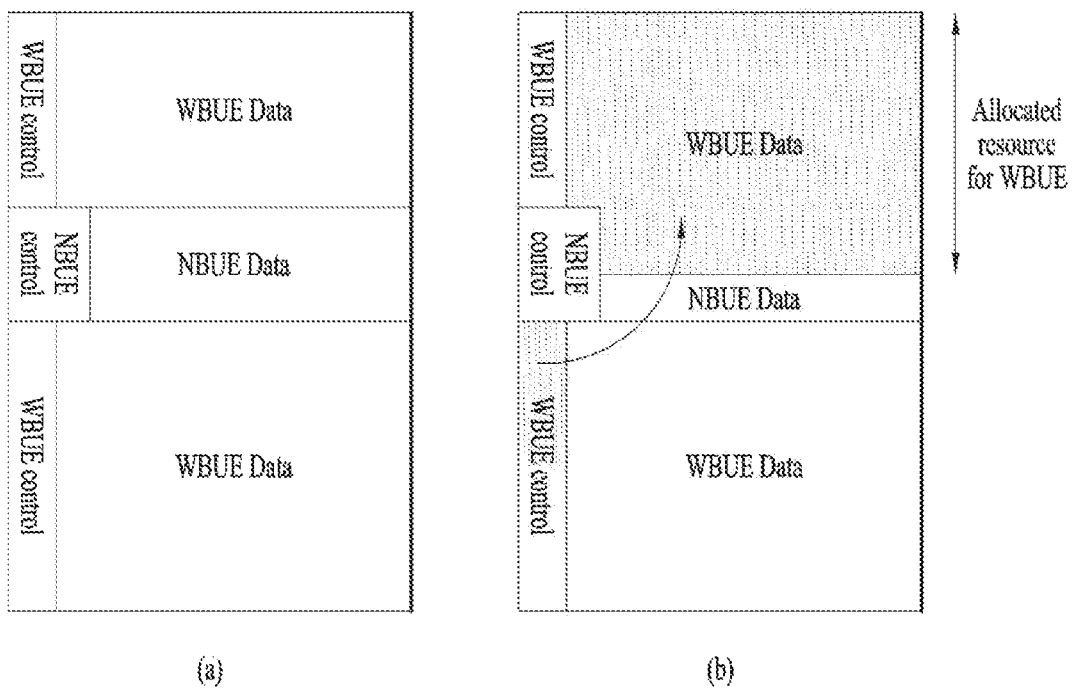

FIG. 14 illustrates a control region according to further still another embodiment of the present invention.

In (a) and (b) of FIG. 14, Examples A and B are applied to Example 3 in combination.

In (a) of FIG. 14, a control region and SS may be configured for a frequency/time resource different per UE type, and the network may indicate, to the WB-UE, to configure SS except a specific region (e.g., NB-UE control region). Similarly, the network may indicate, to the NB-UE, to configure SS in only the NB-UE control region. Meanwhile, the number of control symbols for the WB-UE may be configured differently from the number of control symbols for the NB-UE, and the number of control symbols of the corresponding UE may be transmitted through cell-common or UE-specific signaling.

Meanwhile, even in transmission of user data scheduled through control information, as shown in (a) of FIG. 14, the WB-UE may assume that data are not transmitted on a frequency band (e.g., frequency band where NB-UE control region is located) excluded from the control region for the WB-UE. However, in case of a subframe having no data transmission for the NB-UE, since data resources on the frequency band where the NB-UE control region is located are not used, a resource waste may be caused.

To solve this, as shown in (b) of FIG. 14, the WB-UE may assume that WB-UE data may be transmitted on a data region even in case of the frequency band excluded from the control region for the WB-UE. The network may signal, to the WB-UE, a data starting symbol at which mapping of WB-UE data starts in the frequency band excluded from the WB-UE control region. Alternatively, the WB-UE may identify the data starting symbol through system information on the NB-UE. The system information (e.g., MIB and SIB) on the NB-UE may include information on a data starting symbol (e.g., a starting symbol of a data region of the NB-UE) or the number of control symbols of the NB-UE.

In (b) of FIG. 14, the NB-UE control region is a center k RB(s) of first M (e.g., 2) symbols, the NB-UE data region is located at the same frequency band as the NB-UE control region, and the WB-UE control region is assumed that the center k RB(s) are excluded from a full system band of first N (e.g., 1) symbols.

Referring to the WB-UE data region, the WB-UE data region starts from the N+1th symbol at the other band except the center k RB(s). However, in case of the center k RB(s), the first to the Mth symbols are excluded from the data region of the WB-UE, and data of the WB-UE may be mapped from the M+1th symbol.

The eNB may explicitly signal, to the WB-UE, the M+1th symbol at which data mapping starts, in the center k RB(s). Alternatively, the WB-UE may identify that the NB-UE control region ends at the Mth symbol by overhearing system information of the NB-UE.

Example D) Configuration of Different SSs in the Same Control Region

In the Examples A, B and/or C, CCE mapping may be performed independently per control region (or control resource set) allocated for each SS.

Additionally, according to one embodiment, different SSs may be configured in the same control region (or control resource set). This method may be useful when it is difficult to allocate a plurality of control regions due to a relatively lack of the control region. To this end, control channel candidates may be defined/determined differently per SS.

Meanwhile, as described above, at least a part of a method for determining control channel candidates in the LTE described through the Equation 1 may be reused to determine SS of New RAT.

The method (3GPP TS 36.213) for determining control channel candidates in the LTE is briefly summarized referring to the Equation 1. As described above, in the LTE, $SS_k^{(L)}$ which is SS for an aggregation level Le {1, 2, 4, 8} is defined by a total of $M^{(L)}$ PDCCH candidates. CCE(s) constituting a PDCCH candidate m of a total of $M^{(L)}$ PDCCH candidates are identified through an aggregation level L, $Y_k$, the number $N_{CCE,k}$ of CCEs existing at a subframe, an initial value, etc. In CSS, $Y_k$ is set to 0 with respect to aggregation levels 4 and 8. In USS, $Y_k$ is defined as expressed by the Equation 2.

$$Y_k = (A * Y_{k-1}) \bmod D \quad \text{[Equation 2]}$$

In the Equation 2, A is a constant 39827, $Y_{k-1}$ means a value of $Y_k$ at a previous subframe, and Y_1 which is a value of $Y_{k-1}$ at a subframe 0 is set to identifier RNTI (e.g., C-RNTI, P-RNTI, SI-RNTI, etc.) allocated to the UE. D is a constant 655537. Also, mod means modulo operation.

Finally, according to the legacy LTE scheme, different SSs (e.g., different USSs and/or different CSSs) cannot be configured in view of one UE. For example, in a common search space where levels 4 and 8 are only supported, only one CSS comprised of $S_k^{(4)}$ and $S_k^{(8)}$ may be defined.

However, according to one embodiment of the present invention, different SSs (e.g., different USSs and/or different CSSs) may be defined in the control region (or control resources set). To this end, when CCE(s) constituting a control channel candidate m is(are) determined, additional parameters (e.g., SS index) may be introduced. For example, if the Equations 1 and 2 may be reused, at least one of the parameters of the Equations 1 and 2 may be configured per SS (e.g., SS-specific parameter). In more detail, $Y_{-1,SS\#0}$ may be set as a value of $Y_{-1}$ for SS #0, and $Y_{-1,SS\#1}$ may be set as a value of $Y_{-1}$ for SS #1.

For the above operation, the network may indicate (e.g., MIB, SIB, RRC signaling, etc.), to the UE, to configure and search for a plurality of SSs, and may specifically indicate the number of SSs.

Although one control resource set is configured, assumptions applied to each SS may be different from each other. For example, with respect to SS #0 and SS #1 configured for the same control resource set, the UE may assume the transmission diversity scheme in the SS #0 and assume the beamforming scheme in the SS #1. Also, the UE may assume 2-port RS configuration for the transmission diversity scheme and assume 1-port RS configuration for the beamforming scheme, thereby performing blind detection. Also, if 2-port RS is assumed in the SS #0 and 1-port RS is assumed in the SS #1, RS for one port may exist in the SS #1, or 2-port RS may exist but RS designated per UE may only be assumed.

Meanwhile, in addition to the method for adding/changing the parameters used in the Equations 1 and 2, resource indexing (e.g., REG and CCE) may be performed independently per SS as described above, whereby different SSs may be configured within the same control resource set. In this case, the parameters associated with the SS may be omitted in the Equations 1 and 2.

Figure 15:
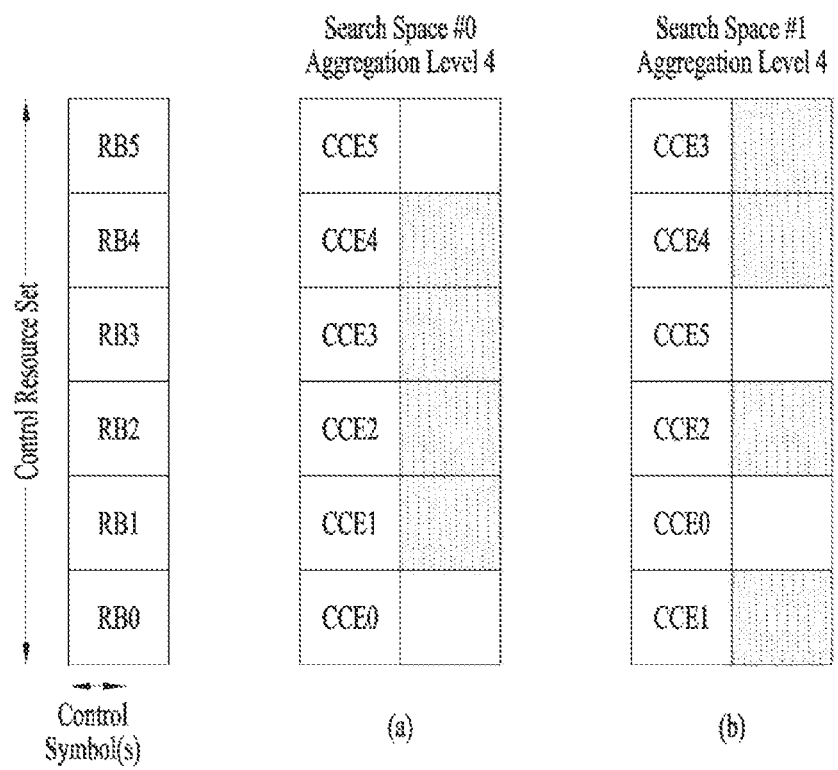
FIG. 15 is a diagram illustrating SS specific CCE indexing according to one embodiment of the present invention.

FIG. 15 is a diagram illustrating SS specific CCE indexing according to one embodiment of the present invention. FIG. 15 is briefly shown for convenience of description, and the followings are assumed to reduce complexity. CCE is defined in a unit of RB, and it is assumed that resources that may be used for control information transmission in one RB constitute one CCE. It is assumed that the control resource set corresponds to control symbols of RB0 to RB5. It is assumed that two SSs are defined in the control resource set. Only an aggregation level 4 of aggregation levels supported with respect to SS #0 and SS #4 will be described. The first control channel candidates (i.e., m=0) of a total of $M^{(4)}$ control channel candidates corresponding to the aggregation level 4 in SS #0 and SS #1 are only shown. It is assumed that the first control channel candidates (i.e., m=0) corresponding to the aggregation level 4 are {CCE1, CCE2, CCE3, CCE4}.

Referring to FIG. 15(a), if the UE attempts blind detection for the first control channel candidate in the SS #0, the UE may attempt decoding for RB combination by assuming that RB1, RB2, RB3 and RB4 of the control resource set are the first control channel candidates. Additionally, the UE attempts blind detection by assuming that 1-port beamforming scheme is applied to SS #0 (e.g., port #0) and RS is transmitted through the corresponding 1-port (e.g., resource mapping of RS of port #0 is assumed). For example, the UE assumes that a signal received from a position of REs into which RS transmitted from port #0 is mapped is RS. The UE estimates a channel for the port #0 by using the signal assumed as RS and attempts demodulation and decoding for control information in RB1, RB2, RB3 and RB4 of the port #0 based on the channel estimated result.

Referring to FIG. 15(b), if the UE attempts blind detection of the first control channel candidate in the SS #1, the UE may attempt decoding for RB combination by assuming that RB0, RB2, RB4 and RB5 of the control resource set are the first control channel candidates. Additionally, the UE attempts blind detection by assuming that 2-port SFBC scheme is applied to SS #1 (e.g., port #0 and port #1) and RS is transmitted through the corresponding 2-port (e.g., resource mapping of RS of port #0 and port #2 is assumed). For example, the UE assumes that signals received from a position of REs into which RSs transmitted from port #0 and port #1 are mapped are port #0 RS and port #1 RS, respectively. The UE estimates channels for the ports #0 and #1 by using the signals assumed as RSs and attempts demodulation and decoding for control information in RB0, RB2, RB4 and RB5 of the ports #0 and #1 based on the channel estimated result. In detail, the UE attempts decoding by assuming that a precoding matrix for SFBC is applied to a complex symbol of each port estimated based on the RS.

Meanwhile, although control channel candidates corresponding to m=0 have been described in FIG. 15, the control channel candidates corresponding to m=1 are defined differently in SS #0 and SS #1. As a result, $S_k^{(4)}$ of SS #0 and $S_k^{(4)}$ of SS #1 are defined differently from each other, and it is noted that this is similarly applied to the other aggregation levels.

As described above, SS specific CCE indexing method is applied, whereby a plurality of SSs may be configured within the same control resource set.

Example E) Configuration of the Same SS in the Same Control Region (or Control Resource Set)

SS identification of the Examples 1 to 3 may be implemented in such a manner that different blind detection schemes may be performed in the same SS. In this case, a plurality of SSs in the Examples 1 to 3 are virtual SSs that may be identified logically, and may be understood that the same physical SS is virtualized/multiplexed into a plurality of logical SSs.

The network may indicate, to the UE, to perform blind detection for one control channel candidate in accordance with different schemes multiple times. For example, the network may configure only one control region (or control resource set) and configure only one SS in the control region (e.g., one physical SS), and then may indicate, to the UE, that a plurality of schemes for blind decoding the corresponding SS exist.

For example, the network may signal such that the UE may perform blind detection for 1-port transmission and blind detection for SFBC transmission per control channel candidate. Alternatively, the transmission scheme of the control channel to be assumed by the corresponding UE may previously be defined or signaled per UE. The number of times or ratio of blind detection attempts to be performed for each transmission scheme may previously be defined or signaled.

The number of times of blind detection to be attempted by the UE per transmission scheme may be determined based on blind detection related capacity of the UE.

As described above, a plurality of different SSs (e.g., virtual SSs) comprised of the same resource(s) within the same control resource set may be configured, and different configurations (e.g., transmission scheme and RS port configuration) may be applied to each SS.

[Blind Detection & Blind Detection Capacity]

The method for configuring the plurality of SSs in accordance with the transmission scheme of the control channel, the type of the control information and the UE type and performing blind detection (BD) of different schemes for the same control channel candidate (e.g., SFBC based BD/1-port transmission scheme based BD) has been described as above. As a result, flexibility of control information signaling may be improved.

Meanwhile, if the number of blind detection times of the UE is increased, complexity of a procedure of receiving control information may be increased. Therefore, a method for improving flexibility of control information signaling considering complexity in view of the UE is suggested.

As described above, the SS is a set of control channel candidates for performing blind detection, and complexity of detection is also increased as the number of control channel candidates is increased. For example, supposing that complexity in case of one SS is 1, complexity of blind decoding for two SSs (i.e., SS comprised of the same number of candidates) having the same size as the corresponding SS is increased to 2. Therefore, it is preferable to apply the aforementioned methods considering the number of a total of candidates that may be blind decoded by the UE within the same subframe. To this end, the following methods may be considered, and may be implemented independently or in combination.

(i) Control of SS Size

If a plurality of SSs are configured, the network may determine a size of each SS by distributing a default SS size, and may indicate the determined size of each SS through cell or UE-specific signaling. The default SS size corresponds to a total number of times (e.g., the number of control channel candidates) for blind detection attempt of the UE at one subframe. Alternatively, the size of each SS may previously be determined in accordance with SS combination.

Size control per SS may mean that some of aggregation levels are not applied to a specific SS. For example, supposing that blind detection times of 6, 6, 2 and 2 times for aggregation levels 1, 2, 4 and 8 in USS are default SS size, the network may define SFBC SS and 1-port transmission SS and indicate blind detection times for the aggregation levels 1, 2, 4 and 8 as 3, 3, 1 and 1 per SS. Alternatively, the network may indicate to perform blind detection only for the aggregation levels 4 and 8 in SFBC SS and perform blind detection only for the aggregation levels 1 and 2 in 1-port transmission SS.

(ii) SS Selective BD

The network may indicate to perform blind detection for a specific SS through cell-specific or UE-specific signaling considering a channel state of a general cell or a channel state per UE. A plurality of SSs may previously be indicated through MIB, SIB, RRC signaling, etc.

The UE may determine SS, which will perform blind detection, of SSs of the control channel based on the measured result reported to the network. For example, the UE may determine SS, which will perform blind detection, in accordance with the result of serving cell measurement (e.g., RRM measurement) and/or CSI measurement. Blind detection for the SS determined as above may be applied after a certain offset (e.g., a certain number of subframes) from the time when the UE reports the corresponding measurement. For example, if CQI measured and reported by the UE is lower than a threshold value, the UE may perform blind detection for only SFBC SS after X subframe(s).

(iii) BD Capacity

Blind detection (BD) capacity of the UE may be defined. The number of SSs, where the UE performs BD, and/or the number of control channel candidates per SS may be determined in accordance with BD capacity. The number of control channel candidates per SS may be controlled through (i) control of SS size described above. Alternatively, the control of the number of control channel candidates per SS may previously be configured or signaled such that BD for a specific control channel candidate of the default SSs is only performed.

To this end, BD related UE capacity may be defined. For example, BD capacity of the UE may be defined by BD times that may be performed within a certain time. Alternatively, a default SS size may be defined, and BD capacity of the UE may be defined through a ratio between the number of control channel candidates, which can perform BD, and the default SS size. Also, the UE may report its BD capacity to the network.

For example, when the network configures SS having the default size to 2 (e.g., SFBC and 1-port transmission), the UE having BD capacity of 2 may perform BD for two SSs, and the UE having BD capacity of 1 may determine control channel candidates, which will perform BD, by applying the aforementioned methods (1) and (ii).

[Control Resource Set/SS—Specific Configuration]

As described above, the control region may be referred to as the control resource set. Also, a plurality of SSs and/or a plurality of control resource sets may be configured (e.g., higher layer signaling or broadcasting), and transmission schemes and RS ports may be configured differently per SS or control resource set.

Hereinafter, additional property/parameter of the control resource set will be described.

In the following suggestion, although it is assumed that one SS is configured per one control resource set, the present invention is not limited to this example. For example, if a plurality of SSs are configured for one control resource set, property/parameter of a control resource set-specific configuration which will be described later may be interpreted as property/parameter of SS-specific configuration. Alternatively, even though the SSs are configured on the same control resource set, control resource set configuration may individually be applied to each SS.

(i) Control Resource Set-Specific Configuration

RS scrambling parameter: The UE monitors DCI through one or more control resource set(s), and the monitored control resource set is configured to a carrier bandwidth or less. Monitoring of a plurality of control resource sets may be used to dynamically change a transmission reception point (TRP) or a cell (e.g., CoMP). In this case, the control resource set-specific scrambling parameter may be configured to implicitly indicate TRP change. For example, a TRP 1 may transmit a scrambled RS 1 through a scrambled parameter 1, and a TRP 2 may transmit a scrambled RS 2 through a scrambled parameter 2. The UE may identify TRP change and the changed TRP based on the scrambling parameter applied to the received RS. The control resource set-specific scrambling parameter may be virtual cell ID.

Transmission scheme information: a transmission scheme for a control resource set may be configured. For example, the UE may assume that 2-port SFBC scheme or 1-port UE-dedicated beamforming scheme is used for each control resource set. Blind detection performed by multiple transmission schemes is favorable for flexible scheduling and operation. If the plurality of transmission schemes are supported and respectively have different properties (e.g., resource mapping, RS structure, PRB bundling scheme, etc.), it is preferable to divide resources for the respective transmission schemes.

Resource mapping information: localized/distributed mapping scheme may be used per control resource set. Time-first mapping/frequency-first mapping may be configured per control resource set. In case of time-first mapping/frequency-first mapping, the same REG indexing is used but REG indexes constituting CCE may be combined differently or different REG indexing methods may be used.

Distributed resource mapping is proper to obtain frequency diversity gain and interference diversity gain, and localized resource mapping is proper to obtain beamforming gain. It is preferable that two kinds of resource mapping schemes are supported for new RAT (NR)-PDCCH. If a plurality of control symbols are configured, frequency-first mapping and time-frequency mapping may be supported for NR-PDCCH to improve channel estimation performance and coding gain. If a different resource structure is required for each resource mapping, the eNB may configure control resource set-specific resource mapping. The UE may perform blind detection for control channel candidates considering the resource mapping scheme configured for the control resource set. Each resource mapping scheme may be associated with the transmission scheme. For example, the transmission diversity scheme may be associated with distributed resource mapping, and the UE-dedicated beamforming scheme may be associated with localized resource mapping.

PRB bundling information: if PRB bundling is used, the UE may assume that the same precoding is applied to a PRB bundle. This may improve channel estimation performance Therefore, the PRB bundling information is related to the transmission scheme and RS type. If SFBC is used for the control resource set, the PRB bundling size may be equal to the corresponding control resource set. On the other hand, a great PRB bundling size cannot be assumed for the control resource set to which UE-dedicated beamforming is applied. Therefore, the PRB bending size may be related to the transmission scheme, and the PRB bundling size may be configured for each control resource set.

RS configuration: the network may configure RS differently per control resource set. For example, in addition to the aforementioned RS scrambled parameter, RS configuration may include, but is not limited to, RS type (e.g., shared-RS/UE-specific RS), the number (e.g., 1 or 2) of RS ports, and RS structure.

The RS type is a type of RS that may be assumed by the UE with respect to the corresponding control resource set. For example, the RS type may indicate shared RS or UE-specific RS. If the shared RS is indicated, the shared-RS may be used within the corresponding PRB or PRB bundling size, and may commonly be applied to a plurality of NR-PDCCHs or NR-PDCCH candidates existing within one PRB (or PRB bundle). The UE-specific RS may be used restrictively within a resource unit such as REG, CCE, and control channel candidate (e.g., NR-PDCCH candidate).

In more detail, referring to DMRS, two types of DMRSs may be considered for NR control channel (e.g., NR-PDCCH). A UE-specific DM-RS for control channel reception may be used for beamforming, and the UE may assume the same precoding operation for NR-PDCCH and the corresponding DM-RS. Meanwhile, if the shared-DMRS is used, multiple NR-PDCCHs within the PRB may share channel estimation based on the shared-DMRS within the corresponding PRB. This may mean that RS does not exist within a resource constituting a specific NR-PDCCH. The shared-DMRS may be used for the transmission diversity scheme (e.g., channel information is inexact), and may be used for common control information signaling (e.g., transmission to a plurality of UEs).

The UE may determine RS type based on resource mapping (e.g., localized/distributed), transmission scheme (e.g., transmission diversity/dedicated beamforming) and/or control resource set (RS type is configured control resource set-specifically).

Meanwhile, it is preferable that the shared-RS/UE-specific RS has a common DM-RS pattern regardless of the transmission scheme and/or the resource mapping scheme. For example, the position of the resource into which RS is mapped may be determined regardless of the type of the corresponding RS, that is, the shared-RS type or the UE-specific RS type.

Also, fixed/variable RS may be included in RS configuration, and the fixed RS may be RS which is always transmitted, and the variable RS may be RS transmitted only if NR-PDCCH is actually transmitted. Meanwhile, indication of the shared-RS/the UE-specific RS and indication of fixed/variable RS may be configured together. For example, it may be assumed that the shared RS is transmitted in the form of the fixed RS and the UE-specific RS is transmitted in the form of the variable RS.

Additionally, RS configuration per control resource set may include the number of RS ports to be assumed by the UE in each control resource set. The number of RS ports may be determined to be associated with the transmission scheme. For example, the UE may assume 2-port RS in the control resource set where the transmission diversity scheme is configured, and the UE may assume 1-port RS in the control resource set where UE-dedicated beamforming is configured.

In short, as control resource set-specific properties, RS scrambling parameter (e.g., virtual cell ID), the transmission scheme, the resource mapping scheme (e.g., localized/distributed mapping, time-first/frequency-first mapping), a PRB bundling size, RS configuration, etc. may be considered. The RS type may be associated with the transmission scheme, and the transmission scheme may be defined per at least control resource set.

(ii) SS-Specific Configuration

To improve flexibility of NR-PDCCH transmission, the UE may be configured to perform blind detection for multiple control resource sets. To this end, entire SSs may be divided into a plurality of sub-SSs (subSSs). The respective sub-SSs may be allocated to different control resource sets. Also, each sub-SS may have its properties, for example, aggregation level(s), the number of control channel candidates to be decoded for each aggregation level, and a set of CCEs for each control channel candidate. The sub-SSs may be interpreted as SSs described in blind detection performance Aggregation level(s): the aggregation level may be configured sub-SS-specifically. For example, sub SS #1 may include control channel candidates corresponding to aggregate levels 1, 2, 4 and 8, and sub SS #2 may include control channel candidates corresponding to aggregation levels 4, 8 and 16. This aggregation level configuration has various advantages. For example, even though the number of available REs is varied per control channel set, a minimum coding rate may be ensured.

The number of control channel candidates for each aggregation level: the number of control channel candidates for each aggregation level may be configured sub-SS-specifically. For example, relatively many control channel candidates may be allocated to a low aggregation level in a sub-SS for UE-dedicated beamforming. On the other hand, relatively many control channel candidates may be allocated to a high aggregation level in a sub-SS for the transmission diversity scheme.

A set of CCEs for each control channel candidate: frequency-first CCE aggregation and time-first CCE aggregation are all supported for NR-PDCCH, and if different sub-SSs are configured for the respective aggregation schemes, a set of CCEs for each control channel candidate may be varied between the sub-SSs.

In this way, all SSs for the UE may be divided into a plurality of sub-SSs, wherein each sub-SS is located in its respective control channel set and may have sub-SS-specific property.

[Control Resource Mapping]

More detailed examples for the case that a resource mapping scheme is defined per control resource set will be described.

The network may configure the resource mapping scheme per control resource set (e.g., higher layer signaling or broadcasting). The control resource mapping scheme may be REG-to-CCE mapping scheme and/or CCE-to-PDCCH mapping scheme, for example.

In the following example, although it is assumed that one SS is configured for one control resource set for convenience, the present invention is not limited to this example. For example, if a plurality of SSs are configured for one control resource set, it may be interpreted that the UE assumes a control resource set resource mapping scheme varied depending on SS where blind detection is performed.

As described above, distributed or localized resource mapping may be used for NR-PDCCH, and distributed resource mapping and localized resource mapping may be identified from each other on the time domain as well as the time domain. In this case, localized resource mapping on the time domain may mean that the resource constituting channel candidates or CCE is first mapped on the time axis. For example, localized resource mapping may be limited to a single OFDM symbol. Alternatively, localized resource mapping may be applied to control resources of the entire time domain in accordance with a size of the control resource set in the time domain.

If localized resource mapping is used, since a plurality of symbols for a corresponding PRB may be used to transmit one NR-PDCCH, it is preferable to localize resources in view of time and frequency to reduce DMRS overhead and share DMRS between different REGs within PRB by allocating RS to only a specific symbol. In case of distributed resource mapping, it is preferable to uniformly distribute resources on the control resource set to obtain spatial diversity gain.

Localized resource mapping is proper to obtain frequency selective scheduling and beamforming gain, and distributed resource mapping is proper to obtain frequency diversity gain. Considering this, the following methods may be considered.

(i) REG indexing method may be determined regardless of localized/distributed resource mapping. For example, REGs may be mapped in accordance with PRB index order. Low REG index may be allocated to REG of PRG having a low index. CCE may include consecutive REGs in case of localized resource mapping, and CCE may include non-consecutive REGs in case of distributed resource mapping.

(ii) REG indexing method may be determined in accordance with localized/distributed resource mapping. Although REG indexes are given in accordance with PRB index order in case of localized resource mapping, REG indexes may be interlaced within control resources on the frequency domain in case of distributed resource mapping. After REG indexing is completed, CCE which belongs to each mapping scheme may include consecutive REG indexes.

(iii) REG indexing method may be determined regardless of localized/distributed resource mapping, and CCE may include consecutive REGs. In case of localized resource mapping, NR-PDCCH corresponding to two or more aggregation levels may include CCEs consecutive on the frequency domain within the control resource set. In case of distributed resource mapping, the NR-PDCCH may include non-consecutive CCEs distributed on the frequency domain.

Figure 16:
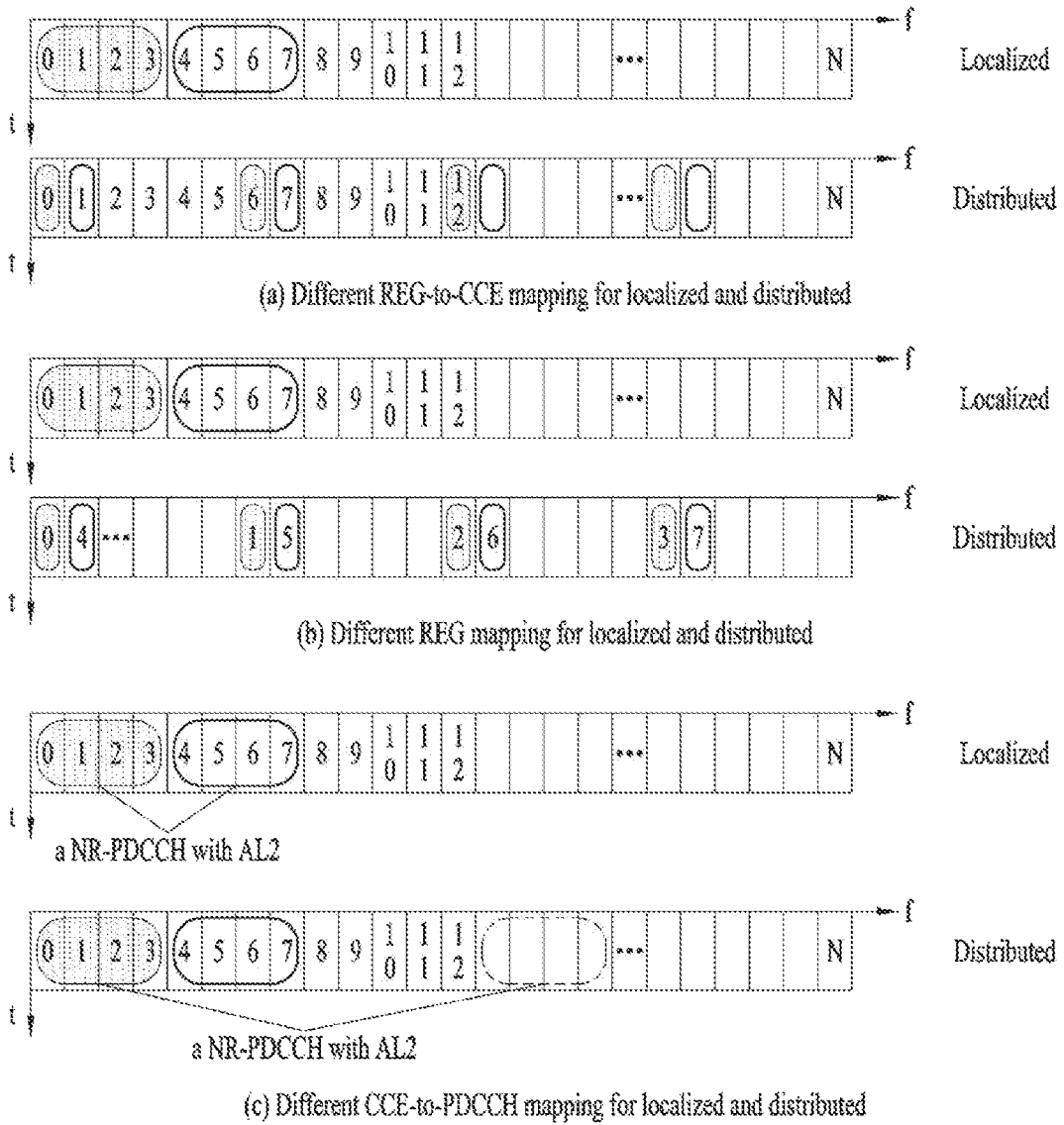
FIGS. 16 and 17 are diagrams illustrating control resource mapping according to one embodiment of the present invention.

FIG. 16 illustrates control resource mapping according to one embodiment of the present invention.

The resource mapping schemes (i) and (ii) indicates results similar to each other, whereas the resource mapping scheme (iii) does not provide frequency diversity gain when an aggregation level is 1.

The above description is an example when the control region includes one OFDM symbol. Since one or several OFDM symbols may exist for each resource mapping scheme, a method for extending resource mapping into several OFDM symbols will be required.

Figure 17:
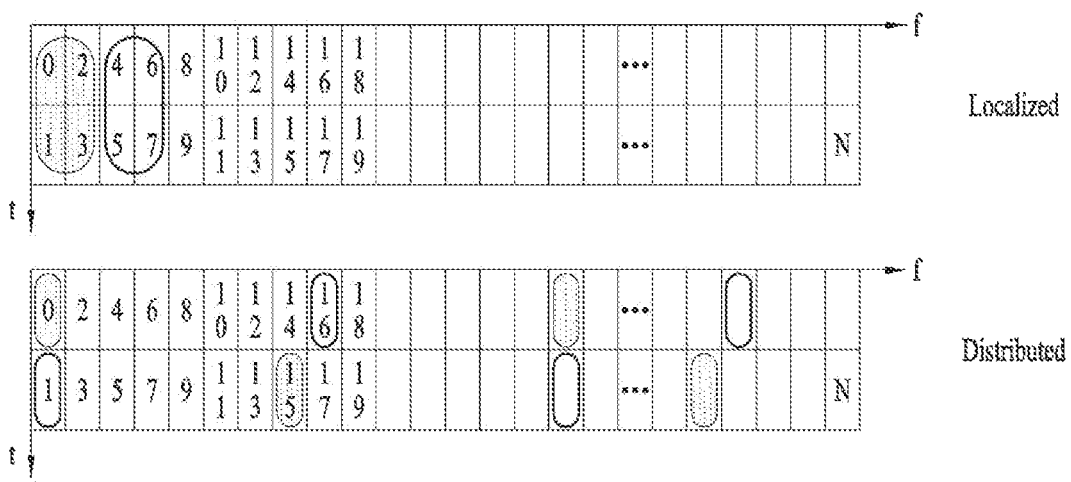
Figure 17:
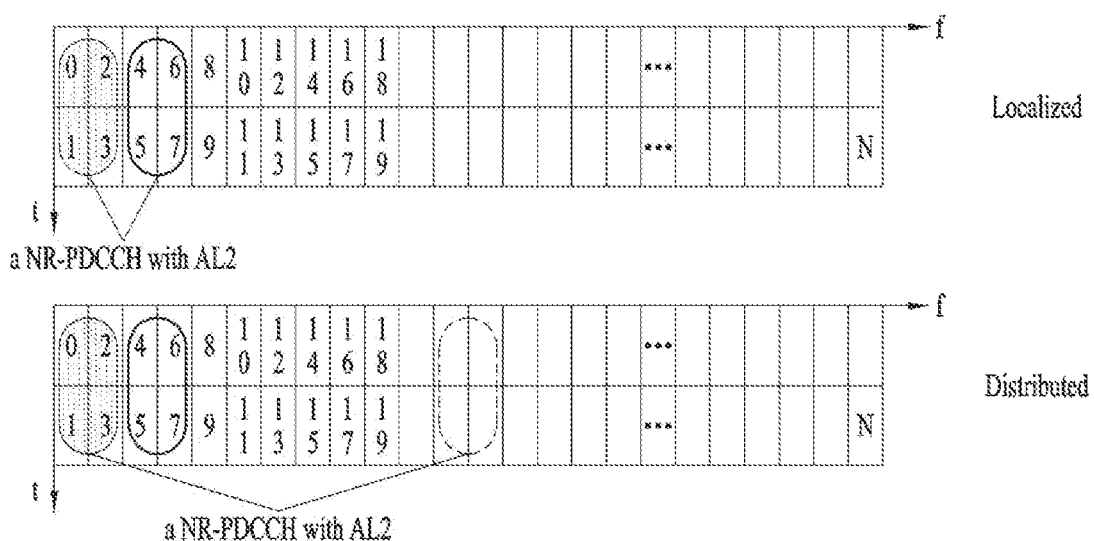

FIG. 17 illustrates control resource mapping according to one embodiment of the present invention.

As described above, it is required that a mechanism for reducing DM-RS overhead by arranging one UE per PRB (or allocating a plurality of symbols within one PRB to one UE) should be considered. Considering this, each of the resource mapping schemes (i) to (iii) may be extended for mapping on several symbols as follows:

(i') REG indexing is determined regardless of localized/distributed resource mapping. If a plurality of OFDM symbols are given, REG indexes are first increased on the time domain and then increased on the frequency domain. CCE may include consecutive REGs in localized resource mapping, and may include non-consecutive REGs in distributed resource mapping. Even in distributed resource mapping, control and data may be multiplexed more efficiently than the case that REGs are allocated onto the same PRB. In this case, consecutive REGs may be selected in the time domain but non-consecutive REGs may be selected in the frequency domain (FIG. 17(a)).

(ii') REG indexing may be performed differently in accordance with localized/distributed resource mapping, and mapping similar to that of (I') may be considered.

(iii') REG indexing may be determined regardless of localized/distributed resource mapping, and CCE may include consecutive REGs. In case of localized resource mapping, NR-PDCCH may include CCEs consecutive on the frequency domain. In case of distributed resource mapping, the NR-PDCCH may include non-consecutive CCEs distributed on the frequency domain (FIG. 17(b)).

As discussed, localized/distributed resource mapping may be applied to CCE-to-NR PDCCH as well as REG-to-CCE mapping. As shown in FIG. 16 (a) and FIG. 17 (a), distributed REG-to-CCE mapping has an advantage in that frequency diversity gain may be obtained even in control channel candidates of an aggregation level of 1. This means that distributed resource mapping is supported in REG-to-CCE mapping. In this case, in CCE-to-PDCCH mapping, the advantage of distributed resource mapping may be reduced. Therefore, it is preferable that both localized and distributed resource mapping schemes may be supported in REG-to-CCE and localized resource mapping is supported in CCE-to-PDCCH mapping.

Figure 18:
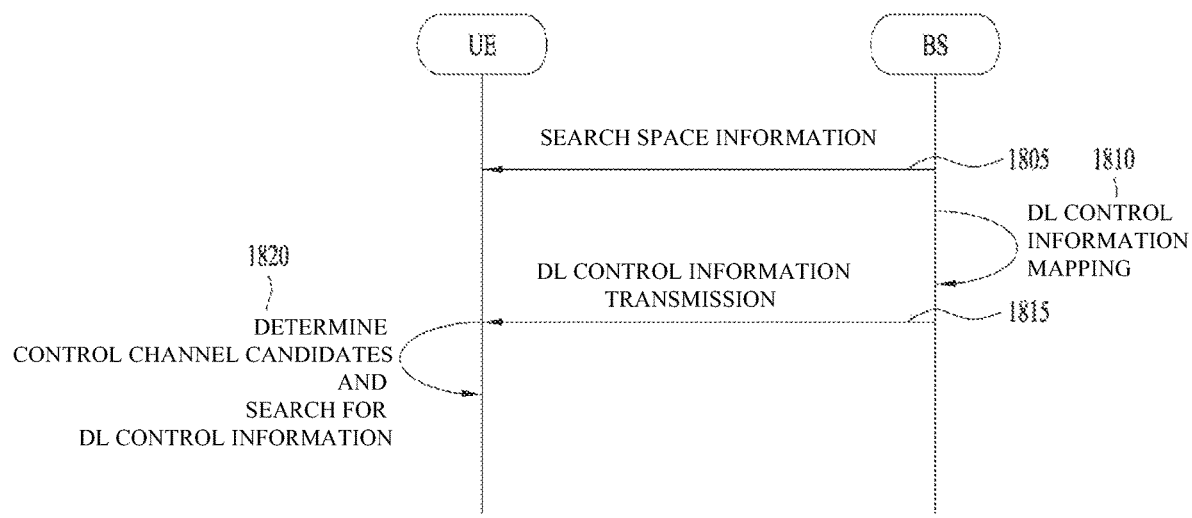
FIG. 18 is a diagram illustrating a flow of a method for transmitting or receiving downlink control information in accordance with one embodiment of the present invention.

FIG. 18 is a diagram illustrating a flow of a method for transmitting or receiving downlink control information in accordance with one embodiment of the present invention. Description repeated with the aforementioned description may be omitted.

Referring to FIG. 18, the UE receives search space information on a self-contained subframe having all of a downlink control symbol, a data symbol and an uplink control symbol (1805).

The eNB maps downlink control information of the UE into one of control channel candidates indicated through the search space information (1810).

The eNB transmits the mapped downlink control information (1815).

The UE searches for the downlink control information of the UE from the control channel candidates (1820). The UE may determine control channel candidates from the downlink control symbol of the self-contained subframe based on the search space information. The control channel candidates may configure at least two search spaces on the downlink control symbol. The UE may search for the downlink control information by assuming a transmission scheme specific to a search space to which each control channel candidate belongs.

The transmission scheme specific to the search space may be one of the transmission diversity scheme and the UE-dedicated beamforming scheme.

At least two search spaces may be configured by applying different control channel element (CCE) indexing methods to one control resource set configured in a downlink control symbol. Alternatively, at least two control resource sets may be configured in the downlink control symbol, and at least two search spaces may belong to their respective control resource sets different from each other.

At least one of a resource mapping scheme of the downlink control information, reference signal configuration for demodulation of the downlink control information, a physical resource block (PRB) bundling size, CCE aggregation levels and the number of control channel candidates corresponding to each of the CCE aggregation levels may be configured as a parameter specific to the search space through the search space information.

The UE may search for the downlink control information by assuming 2-port reference signal transmission and distributed resource mapping of the downlink control information when the transmission scheme specific to the search space is the transmission diversity scheme. The UE may search for the downlink control information by assuming 1-port reference signal transmission and localized resource mapping of the downlink control information when the transmission scheme specific to the search space is the UE-dedicated beamforming scheme.

One of at least two search spaces may be selected in accordance with a bandwidth supported by the UE or a type of the downlink control information to be searched by the UE.

The a total number of the control channel candidates may be determined based on blind detection capacity of the UE. The determined total number of the control channel candidates may be distributed over the at least two search spaces in accordance with a size of each search space.

Figure 19:
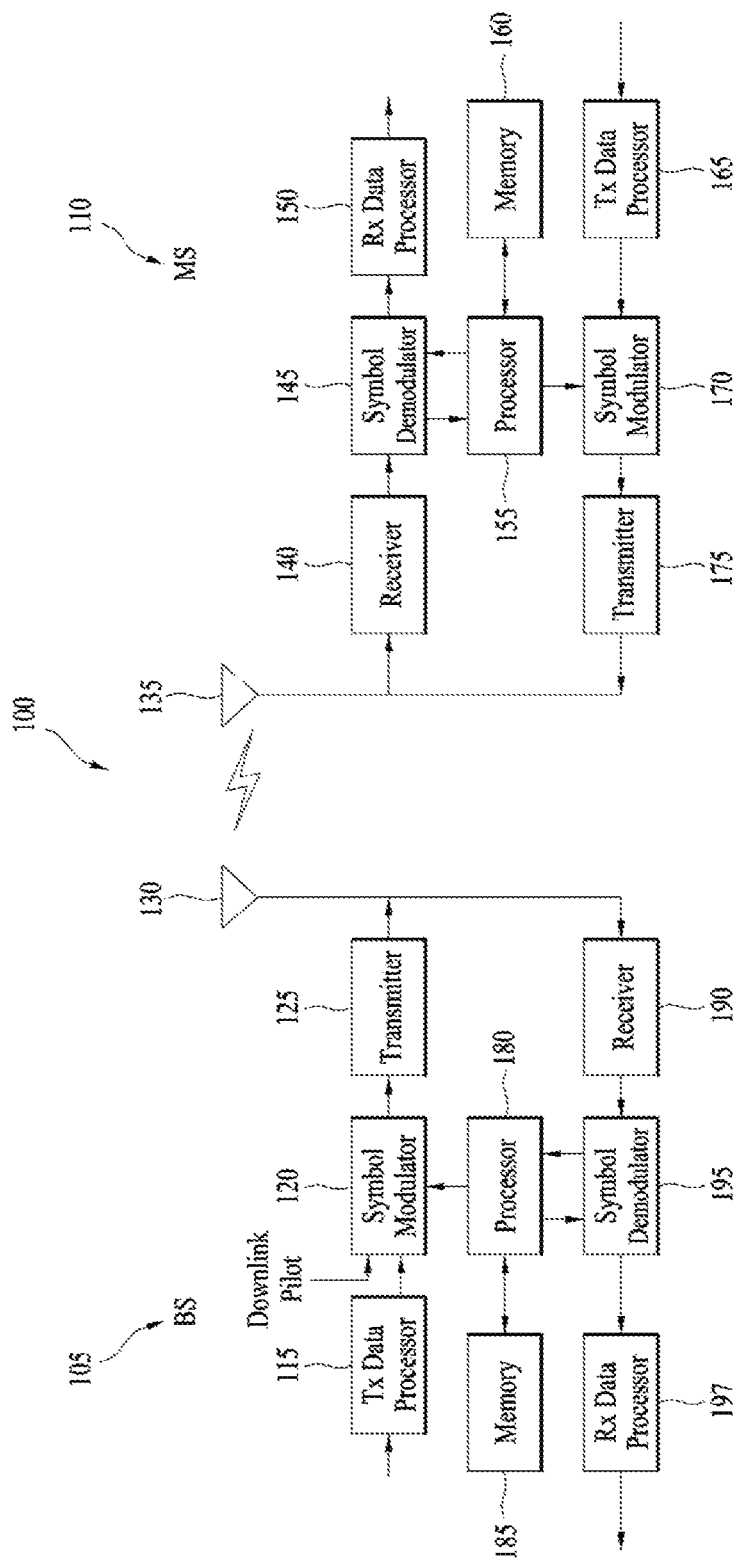
FIG. 19 is a diagram illustrating a UE and an eNB according to one embodiment of the present invention.

FIG. 19 is a block diagram for configurations of an eNB 105 and a user equipment 110 in a wireless communication system 100.

Although one eNB 105 and one user equipment 110 (D2D user equipment included) are shown in the drawing to schematically represent a wireless communication system 100, the wireless communication system 100 may include at least one eNB and/or at least one user equipment.

Referring to FIG. 19, an eNB 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the eNB/user equipment 105/110 includes one antenna 130/135 in the drawing, each of the eNB 105 and the user equipment 110 includes a plurality of antennas. Therefore, each of the eNB 105 and the user equipment 110 of the present invention supports an MIMO (multiple input multiple output) system. And, the eNB 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the eNB and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the eNB 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/eNB 110/105 directs operations (e.g., control, adjustment, management, etc.) of the user equipment/eNB 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/eNB and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and an eNB may be able to exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention mentioned in the foregoing description are applicable to various kinds of mobile communication systems.

What is claimed is:

1. A method for receiving, by a user equipment (UE), control information in a wireless communication system, the method comprising:
 receiving search space information on a self-contained subframe having all of a downlink control symbol, a data symbol, and an uplink control symbol;
 determining control channel candidates in the downlink control symbol of the self-contained subframe based on the search space information; and
 searching for downlink control information of the UE from the determined control channel candidates,
 wherein the determined control channel candidates constitute at least two search spaces on the downlink control symbol, and
 wherein the UE searches for the downlink control information by assuming a transmission scheme that is specific to a search space to which each control channel candidate belongs.

2. The method according to claim 1, wherein the transmission scheme specific to the search space is one of a transmission diversity scheme and a UE-dedicated beamforming scheme.

3. The method according to claim 1, wherein the at least two search spaces are configured by applying different control channel element (CCE) indexing methods to one control resource set configured in the downlink control symbol.

4. The method according to claim 1, wherein at least one of a resource mapping scheme of the downlink control information, reference signal configuration for demodulation of the downlink control information, a physical resource block (PRB) bundling size, control channel element (CCE) aggregation levels and a number of control channel candidates corresponding to each of the CCE aggregation levels is configured as a parameter specific to the search space through the search space information.

5. The method according to claim 4,
 wherein the UE searches for the downlink control information by assuming 2-port reference signal transmission and distributed resource mapping of the downlink control information when the transmission scheme specific to the search space is a transmission diversity scheme, and
 wherein the UE searches for the downlink control information by assuming 1-port reference signal transmission and localized resource mapping of the downlink control information when the transmission scheme specific to the search space is a UE-dedicated beamforming scheme.

6. The method according to claim 1, further comprising:
 selecting one of the at least two search spaces in accordance with a bandwidth supported by the UE or a type of the downlink control information to be searched by the UE.

7. The method according to claim 1,
 wherein a total number of the control channel candidates is determined based on blind detection capacity of the UE, and
 wherein the determined total number of the control channel candidates are distributed over the at least two search spaces in accordance with a size of each search space.

8. A user equipment (UE) for receiving control information in a wireless communication system, the UE comprising:
 a receiver for receiving search space information on a self-contained subframe having all of a downlink control symbol, a data symbol, and an uplink control symbol; and
 a processor for determining control channel candidates in the downlink control symbol of the self-contained subframe based on the search space information and searching for downlink control information of the UE from the determined control channel candidates, wherein the determined control channel candidates constitute at least two search spaces on the downlink control symbol, and wherein the processor searches for the downlink control information by assuming a transmission scheme that is specific to a search space to which each control channel candidate belongs.

9. A method for transmitting, by a base station, control information in a wireless communication system, the method comprising:

transmitting, to a user equipment (UE), search space information on a self-contained subframe having all of a downlink control symbol, a data symbol, and an uplink control symbol;

mapping downlink control information of the UE into one of control channel candidates indicated through the search space information; and transmitting the downlink control information to the UE, wherein the control channel candidates constitute at least two search spaces on the downlink control symbol, and wherein the base station maps and transmits the downlink control information by considering a transmission scheme that is specific to a search space to which each control channel candidate belongs.

10. The method according to claim 9, wherein the transmission scheme specific to the search space is one of a transmission diversity scheme and a UE-dedicated beamforming scheme.

11. The method according to claim 9, wherein the at least two search spaces are configured by applying different control channel element (CCE) indexing methods to one control resource set configured in the downlink control symbol.

12. The method according to claim 9, wherein at least one of a resource mapping scheme of the downlink control information, reference signal configuration for demodulation of the downlink control information, a physical resource block (PRB) bundling size, control channel element (CCE) aggregation levels and a number of control channel candidates corresponding to each of the CCE aggregation levels is configured as a parameter specific to the search space through the search space information.

13. The method according to claim 12, wherein 2-port reference signal transmission and distributed resource mapping of the downlink control information are used when the transmission scheme specific to the search space is a transmission diversity scheme, and wherein 1-port reference signal transmission and localized resource mapping of the downlink control information are used when the transmission scheme specific to the search space is a UE-dedicated beamforming scheme.

14. The method according to claim 9, further comprising:
selecting one of the at least two search spaces in accordance with a bandwidth supported by the UE or a type of the downlink control information.

15. The method according to claim 9, wherein a total number of the control channel candidates is determined based on blind detection capacity of the UE, and wherein the determined total number of the control channel candidates are distributed over the at least two search spaces in accordance with a size of each search space.

* * * * *